(12) United States Patent
Yamada et al.

(10) Patent No.: US 8,303,738 B2
(45) Date of Patent: Nov. 6, 2012

(54) METAL HEATING APPARATUS, METAL HEATING METHOD, AND LIGHT SOURCE APPARATUS

(75) Inventors: Eiichiro Yamada, Yokohama (JP);
Hiroshi Kohda, Yokohama (JP); Hiroshi Suganuma, Yokohama (JP); Akira Inoue, Yokohama (JP); Kazuhito Saito, Yokohama (JP); Koji Nakazato, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 1567 days.

(21) Appl. No.: 10/954,354

(22) Filed: Oct. 1, 2004

(65) Prior Publication Data

US 2006/0021681 A1    Feb. 2, 2006

Related U.S. Application Data

(60) Provisional application No. 60/556,376, filed on Mar. 26, 2004, provisional application No. 60/583,357, filed on Jun. 29, 2004.

(30) Foreign Application Priority Data

Oct. 3, 2003    (JP) ............................... P2003-346199
May 7, 2004    (JP) ............................... P2004-138983

(51) Int. Cl.
*C22F 3/00*    (2006.01)
(52) U.S. Cl. ....................... 148/512; 148/565
(58) Field of Classification Search ............... 148/565, 148/512
See application file for complete search history.

(56) References Cited

U.S. PATENT DOCUMENTS

| 5,049,718 | A | 9/1991 | Spletter et al. |
| 5,272,309 | A | 12/1993 | Goruganthu et al. |
| 6,369,351 | B1 | 4/2002 | Hesener |
| 2002/0046789 | A1* | 4/2002 | Grimme ........................ 148/565 |
| 2002/0159494 | A1 | 10/2002 | Tojo et al. |

FOREIGN PATENT DOCUMENTS

| CN | 1380726 A | 11/2002 |
| JP | 03-032098 | 2/1991 |
| JP | 04-066285 | 3/1992 |
| JP | 05-018751 | 3/1993 |
| JP | 08-071425 | 3/1994 |
| JP | 06-216516 | 8/1994 |
| JP | 06-326389 | 11/1994 |
| JP | 08-008527 | 1/1996 |
| JP | 08-281460 | 10/1996 |
| JP | 11-197868 | 7/1999 |
| JP | 11-254160 | 9/1999 |
| JP | 2000-031564 | 1/2000 |

(Continued)

OTHER PUBLICATIONS

English language translation of Japanese 2001-047222 A, Feb. 2001.*

(Continued)

*Primary Examiner* — Scott Kastler
(74) *Attorney, Agent, or Firm* — McDermott Will & Emery LLP

(57) ABSTRACT

A metal heating apparatus according to an embodiment of the present invention comprises a light output portion for outputting light having a center wavelength in a wavelength range of 200 nm to 600 nm.

39 Claims, 19 Drawing Sheets

FOREIGN PATENT DOCUMENTS

| | | |
|---|---|---|
| JP | 2002-523247 | 7/2000 |
| JP | 2001-047222 | 2/2001 |
| JP | 2002-001521 | 1/2002 |
| JP | 2002-239717 | 8/2002 |
| JP | 2002-314197 | 10/2002 |
| KR | 10-2003-0075246 A | 9/2003 |
| WO | WO 2005/032752 A1 | 4/2005 |

OTHER PUBLICATIONS

"Machining Laser"; vol. 7; pp. 59-62; Published by Ohm-sha.

Michael Greenstein "Optical Absorption Aspects of Laser Soldering for High Density Interconnects" Applied Optics vol. 28 No. 21 p. 45950-4603 Nov. 1, 1989 New York.

Supplementary European Search Report and Written Opinion issued in European Patent Application No. EP 04788434.1-2302/1676661 dated on Aug. 12, 2008.

Chinese Office Action, with English translation, issued in Chinese Patent Application No. CN 200480028786.2, mailed Jul. 11, 2008.

Chinese Office Action, w/ English translation thereof, issued in Chinese Patent Application No. CN 2004800287862 dated Jan. 9, 2009.

Japanese Office Action, with English translation, issued in Japanese Patent Application No. 2005-514450, mailed Oct. 5, 2010.

Korean Office Action, w/ English translation thereof, issued in Korean Patent Application No. KR 10-2006-7008507 dated Mar. 30, 2011.

Japanese Office Action, w/ English translation thereof, issued in Japanese Patent Application No. JP 2005-514450 dated Jul. 5, 2011.

Chinese Office Action, w/ English translation thereof, issued in Chinese Patent Application No. CN 2009102065594.0 dated Jun. 22, 2011.

Japanese Notice of Reasons for Rejection, with English Translation, issued in Japanese Patent Application No. 2005-514450, dated Feb. 22, 2011.

* cited by examiner

METAL HEATING APPARATUS, METAL HEATING METHOD, AND LIGHT SOURCE APPARATUS

CROSS-REFERENCE TO RELATED APPLICATION

This application claims priority to Provisional Application Ser. No. 60/556,376 filed on Mar. 26, 2004 and a Provisional Application filed on Jun. 29, 2004 of which application Ser. No. 60/583,357 and of which title is a soldering method, which are hereby incorporated by reference in their entirety.

BACKGROUND OF THE INVENTION

1. Field of the Invention

The present invention relates to a metal heating apparatus, a metal heating method, and a light source apparatus.

2. Related Background Art

There are a variety of devices for heating metal. For example, soldering is performed by heating with a heater, and by heating by laser beam irradiation as well.

Laser beams of wavelengths from the far infrared region to the long-wavelength visible region have been used heretofore in order to heat a solder by laser beam irradiation, as described in Japanese Utility Model Laid-Open No. 5-18751 or in Masayuki Ikeda "Laser Engineering," Ohmsha, pp. 59-62 (e.g., Patent Document 1 and Non-patent Document 1).

In production of electronic equipment, for example, soldering is carried out in order to electrically connect electronic components, wires, and so on. Soldering is done by melting a solder on a metal member and thereafter solidifying the molten solder. Japanese Patent Applications Laid-Open No. 6-71425, Laid-Open No. 11-197868, and Laid-Open No. 2002-239717 disclose apparatus and methods capable of soldering by melting a solder by laser beam irradiation. The soldering methods disclosed in these documents are intended to increase a temperature rise rate of the solder.

SUMMARY OF THE INVENTION

It was, however, difficult for the conventional devices to perform efficient heating according to each object.

An object of the present invention is therefore to provide a metal heating apparatus, a metal heating method, and a light source apparatus capable of performing efficient heating according to each object.

A metal heating apparatus according to an aspect of the present invention comprises light outputting means for outputting light having a center wavelength in a wavelength range of 200 nm to 600 nm A metal heating method according to another aspect of the present invention comprises: a step of outputting light having a center wavelength in a wavelength range of 200 nm to 600 nm, from light outputting means; and a step of applying the light onto a metal member.

According to the present invention, the light outputted from the light outputting means has the center wavelength in the wavelength range of 200 nm to 600 nm. According to the present invention, since the center wavelength of the light is in the aforementioned wavelength range, a metal member containing gold (Au) is efficiently heated. In the present invention, the light to be outputted may be light having a center wavelength in a wavelength range of 390 nm to 420 nm.

Preferably, the metal heating apparatus of the present invention further comprises light guiding means having an entrance end optically coupled to the light outputting means, and an exit end, to receive the light from the light outputting means through the entrance end and to guide the light to output the light from the exit end. In addition, it is preferable that the metal heating method of the present invention further includes a step of injecting the light into an entrance end of light guiding means and guiding the light by the light guiding means to output the light from an exit end of the light guiding means. In this case, the position of the exit end relative to the light outputting means can be arranged freely, thereby increasing the freedom of designing the apparatus.

In the metal heating apparatus of the present invention, the light outputting means can comprise a light source for outputting the light. In the metal heating apparatus of the present invention, the light source is preferably a laser light source. In this case, a wavelength of the light becomes small. Therefore, the light having a wavelength suitable for heating can be irradiated efficiently. In addition, the light source is preferably a light source with a semiconductor device. In these cases, the luminous efficiency is high and the lifetime of the light source is long, which is advantageous in miniaturization of the apparatus. In the metal heating method of the present invention, it is preferable to output a laser beam as the aforementioned light.

In the metal heating apparatus of the present invention, the light guiding means is an optical fiber. In the metal heating method of the present invention, the light is preferably guided by an optical fiber as the light guiding means. In this case, since the optical fiber is lightweight and flexible, the light irradiation position can be readily changed and degrees of freedom are high.

The metal heating apparatus according to the present invention may further comprise a lens for converging or collimating the light. The metal heating method of the present invention may further include a step of enlarging, converging, or collimating the light by a lens. In this case, a size (i.e. diameter) of the irradiation of the light and a power density of the light can be adjusted to a desired degree.

In the metal heating apparatus according to the present invention, the light outputting means can comprise a plurality of light sources for outputting the light. The plurality of light sources are preferably laser light sources. In addition, the light sources are further preferably light sources with semiconductor device. In this case, since the power of the light outputted from the light guiding means is high, the light irradiation area can be expanded and the light power density can be increased. In addition, since drive currents supplied to the individual light sources can be decreased, the frequency of failure of each semiconductor laser light source can be reduced. Furthermore, when the breakdown of the light source occurs, the output control that compensate decrease of the output of the light source which is out of order with increase of the outputs of the other light sources which are not out of order, thereby the frequency of failure of the apparatus can be reduced. In the metal heating method according to the present invention, it is preferable to output the light from a plurality of light sources and, in this case, the light is preferably laser light.

The foregoing plurality of light sources may comprise a first light source for outputting light of a first center wavelength, and a second light source for outputting light of a second center wavelength. In this case, the center wavelengths of the light sources are adjusted to center wavelengths suitable for heating the respective metals to be irradiated, thereby efficient heating can be performed.

In the metal heating apparatus of the present invention, preferably, the light guiding means comprises a plurality of optical fibers provided in one-to-one correspondence to the plurality of light sources, and each optical fiber guides light outputted from a corresponding light source out of the plurality of light sources. In the metal heating method of the present invention, preferably, each of a plurality of optical fibers as the light guiding means provided in one-to-one correspondence to the plurality of light sources guides light outputted from a corresponding light source out of the plurality of light sources. In this case, the light outputted from each light source is guided by a corresponding optical fiber to be applied onto the metal member. Further, in this case, lights from the lights sources having their respective intensities or their respective center wavelengths different from each other can be irradiated individually without mixture. Therefore, it becomes possible to efficiently heat objects having their shapes or materials two-dimensionally different from each other.

The metal heating apparatus according to the present invention may further comprise a plurality of lenses provided in one-to-one correspondence to the plurality of light sources. The metal heating method according to the present invention may further comprise a step of converging or collimating the light by a plurality of lenses provided in one-to-one correspondence to the plurality of light sources.

The metal heating apparatus according to the present invention preferably further comprises a controller for individually controlling output operations of the respective light sources. The metal heating method of the present invention may further comprise a step of individually controlling output operations of the respective light sources by a controller. In this case, the output operations of the respective light sources are individually controlled by the controller, whereby it is feasible to individually regulate the power of light guided by an optical fiber corresponding to each light source and applied onto the metal member.

In the metal heating apparatus according to the present invention, preferably, exit ends of the respective optical fibers are arrayed in a one-dimensional or two-dimensional pattern. In this case, the range of light irradiation can be expanded and the controller controls the output operations of the individual light sources, so that the range of light irradiation can be variable.

The metal heating apparatus according to the present invention preferably further comprises mounting means provided along a plane with which the light from the exit ends of the respective optical fibers intersects; image taking means for taking an image of a region on the mounting means; guide means for moving the mounting means or the exit ends, based on the image taken by the image taking means; and a controller for individually controlling output operations of the respective light sources. The metal heating method according to the present invention preferably further comprises a step of mounting the metal member on mounting means; a step of taking an image of the metal member by image taking means; a step of adjusting a position of the metal member or the exit ends, based on the image taken by the image taking means; and a step of individually controlling output operations of the respective light sources by a controller. According to the present invention, the metal member is mounted on the mounting means, whereby the light irradiation position relative to the metal member can be accurately adjusted.

A light source apparatus according to still another aspect of the present invention comprises a plurality of light sources; a plurality of optical fibers provided in one-to-one correspondence to the plurality of light sources; and a controller for individually controlling output operations of the respective light sources. This light source apparatus is able to apply various patterns of light onto an object.

In the metal heating apparatus according to the present invention, preferably, the controller controls the output operations of the light sources so that an intensity of light applied onto a second region surrounding a part of a first region is larger than an intensity of light applied onto the first region on the mounting means. The metal heating apparatus according to the present invention can be an apparatus for heating a solder. In this case, only a portion to be soldered can be heated, and a portion not to be soldered is not heated by a reflow process. Therefore, the yield and reliability of a soldered portion can be improved.

In the metal heating method of the present invention, preferably, the output operations of the light sources are controlled so that an intensity of light applied onto a second region surrounding a part of a first region is larger than an intensity of light applied onto the first region on the mounting means. The metal heating method of the present invention can be a method of heating a solder by applying the light onto the metal member. The metal heating method of the present invention preferably further comprises a step of supplying a solder containing tin, onto the metal member, the metal member contains gold, and the step of adjusting the position of the metal member preferably comprises adjusting a position of the solder to the first region and adjusting the position of the metal member to the second region. In the light source apparatus of the present invention, preferably, the controller controls the output operations of the light sources so that an intensity of light applied onto a second region surrounding a part of a first region is larger than an intensity of light applied onto the first region on the mounting means.

According to the present invention, for example, where a wiring pattern on a substrate is soldered to a terminal of an IC, a solder is located in the first region and the wiring pattern in the second region, whereby the solder can be melted by heat of the wiring pattern, which can improve the yield and reliability of soldering.

The metal heating apparatus according to the present invention preferably further comprises an optical fiber having an input end optically coupled to exit ends of the respective optical fibers, and an output end for outputting light injected into the input end. In this case, the power of laser light applied onto the solder can be increased.

A metal heating method according to the present invention comprises (1) a step of supplying a second metal member onto a first metal member; and (2) a step of applying light onto both of the first metal member and the second metal member or onto the first metal member only. This light is preferably a laser beam.

In the metal heating method of the present invention, preferably, (3a) the step of applying the light comprises applying the light of a center wavelength at which a reflectance of the second metal member is larger than a reflectance of the first metal member. By this metal heating method of the present invention, a temperature rise rate of the first metal member can be made greater than that of the second metal member. It is also feasible to control a temperature rise at each position on the first metal member or on the second metal member.

In the metal heating method according to the present invention, the second metal member may be a solder. The first metal member may comprise gold as a primary component and the second metal member may comprise tin as a primary component. In this case, the center wavelength of the light is preferably not more than 550 nm. In this case, the metal member is compatible with the solder in soldering. Since the temperature of the first metal member can be raised ahead, the solder can be melted from the part in contact with the first metal member. Accordingly, soldering can be done with high yield and reliability. Here, the meaning of including a material "as a primary component" is a meaning of including the material "at the highest rate". Therefore, the case in which the rate of the material is not more than 50% is included in the meaning.

In the metal heating method according to the present invention, preferably, (3b) the light is applied so that a light irradiation area on the first metal member is larger than a light irradiation area on the second metal member. It is also preferable to apply the light onto the first metal member only. In this case, preferably, the first metal member comprises gold as a primary component and the center wavelength of the light is less than 600 nm. The second metal member is preferably a solder comprising tin as a primary component. In this case, a temperature rise rate of the first metal member can also be made greater than that of the second metal member. Where the second metal member is a solder, it is convenient in first melting the part of the solder in contact with the first metal member.

In the metal heating method according to the present invention, preferably, (3c) the light is applied so that an energy deposition amount to the first metal member is larger than an energy deposition amount to the second metal member. The second metal member is preferably a solder. Preferably, the first metal member comprises gold as a primary component and the second metal member comprises tin as a primary component. In this case, a temperature rise rate of the first metal member can also be made greater than that of the second metal member. Where the second metal member is a solder, it is convenient in first melting the part of the solder in contact with the first metal member.

In the metal heating method according to the present invention, preferably, (3d) a light beam of a first center wavelength and a light beam of a second center wavelength are applied as the laser beam. In this case, a temperature rise rate of the first metal member can also be made greater than that of the second metal member.

In the metal heating method according to the present invention, preferably, the light beam of the first center wavelength and the light beam of the second center wavelength are outputted from a common exit position. In this case, preferably, the light beam of the first center wavelength and the light beam of the second center wavelength are guided by a common optical fiber and each of the light beam of the first center wavelength and the light beam of the second center wavelength is outputted from an end face of the optical fiber to be applied onto the first metal member or onto the second metal member. In this case, it is feasible to construct a simple and inexpensive optical system for guiding or applying the laser light onto the first metal member or onto the second metal member.

In the metal heating method according to the present invention, preferably, the light beam of the first center wavelength is applied so that a light irradiation area on the first metal member is larger than a light irradiation area on the second metal member, and the light beam of the second center wavelength is applied so that a light irradiation area on the second metal member is larger than a light irradiation area on the first metal member. In this case, preferably, the light beam of the first center wavelength and the light beam of the second center wavelength are guided by a bundle fiber, and the light beam of the first center wavelength and the light beam of the second center wavelength are outputted from mutually different, respective exit positions of the bundle fiber to be applied onto the first metal member or onto the second metal member. In this case, the irradiation with the light beam of the first center wavelength is dominant in the temperature rise of the first metal member, while the irradiation with the light beam of the second center wavelength is dominant in the temperature rise of the second metal member. Therefore, it is feasible to achieve optimal heating, by regulating one of the wavelengths, irradiation intensities, irradiation ranges, etc. of the light beam of the first center wavelength and the light beam of the second center wavelength. Where the bundle fiber is used, it is feasible to construct a simple and inexpensive optical system for guiding or applying the light onto the first metal member or onto the second metal member.

In the metal heating method according to the present invention, preferably, a center wavelength of the light beam of the first center wavelength is a wavelength width or more different from a center wavelength of the light beam of the second center wavelength. In another preferred example, the center wavelength of the light beam of the first center wavelength is 100 nm or more different from the center wavelength of the light beam of the second center wavelength. By using the light beam of the first center wavelength and the light beam of the second center wavelength having their respective center wavelengths different from each other in this manner and by properly setting various conditions in the application of light onto the first metal member or onto the second metal member, it is feasible to perform efficient heating.

In the metal heating method according to the present invention, preferably, the first metal member comprises gold as a primary component and the first center wavelength is less than 600 nm. Preferably, the second metal member comprises tin as a primary component and the second center wavelength is not less than 600 nm. The second metal member is preferably a solder. In this case, the first metal member is compatible in soldering with the solder being the second metal member. Since the reflectance of gold is low at the center wavelengths of less than 600 nm, the first metal member can be efficiently heated when the light of the center wavelength of less than 600 nm is applied onto the first metal member comprising gold as a primary component. Since a relatively inexpensive light source with high output power is available as a light source for outputting light of the center wavelength of not less than 600 nm and since the wavelength dependence of reflectance of tin is insignificant, the application of the light of the center wavelength of not less than 600 nm is advantageous to the second metal member comprising tin as a primary component.

DESCRIPTION OF THE PREFERRED EMBODIMENTS

The best mode for carrying out the invention will be described below in detail with reference to the accompanying drawings. The same elements will be denoted by the same reference symbols throughout the description of the drawings, without redundant description.

First Embodiment

Figure 1:
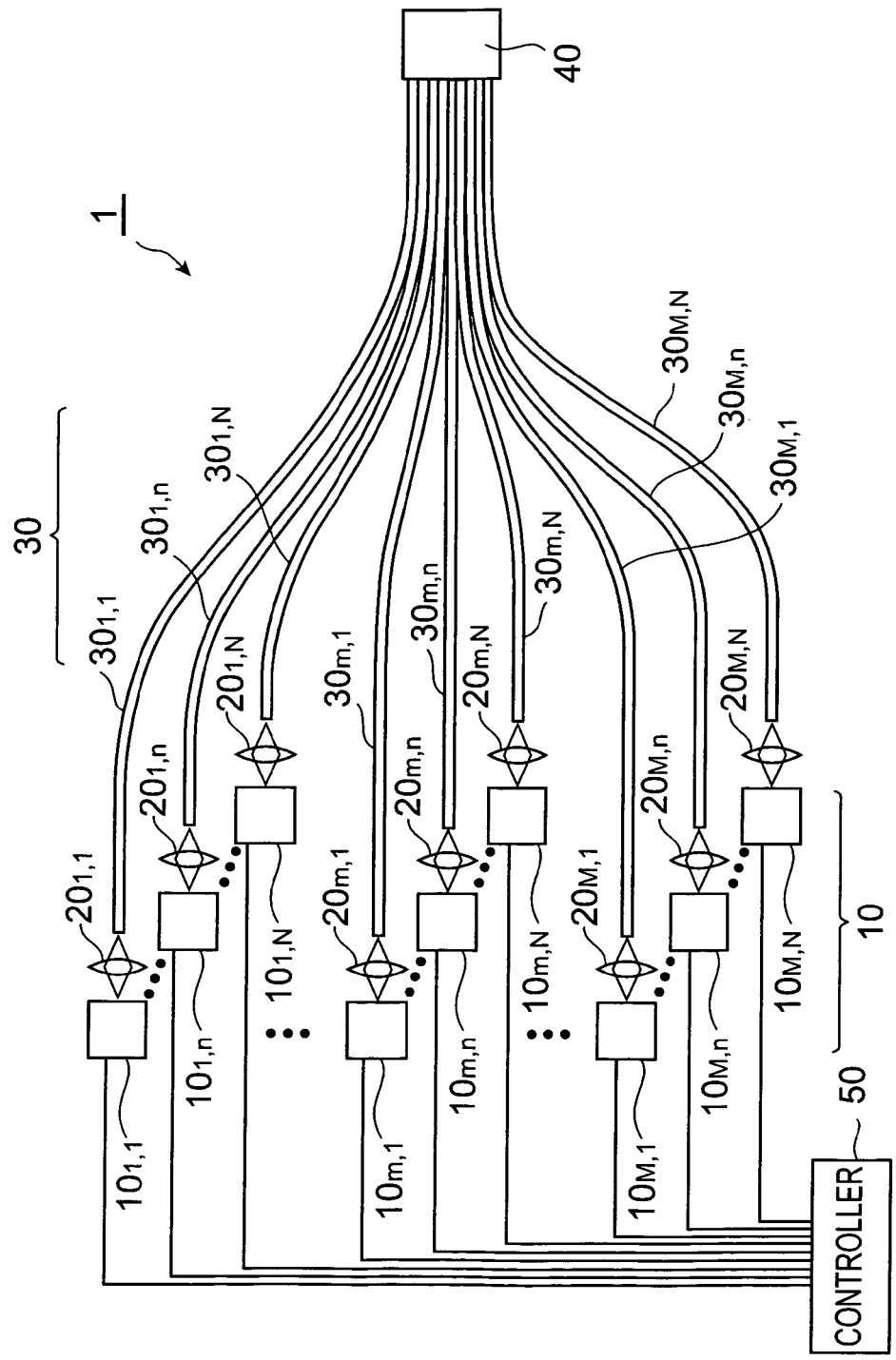
FIG. 1 is a configuration diagram of a metal heating apparatus according to the first embodiment.

First, the first embodiment of the metal heating apparatus according to the present invention will be described. FIG. 1 is a configuration diagram of the metal heating apparatus according to the first embodiment. The metal heating apparatus 1 shown in this figure has a light output portion 10, M×N lenses $20_{1,1}$-$20_{M,N}$, a light guide portion (light guiding means) 30, a securing member 40, and a controller 50. Here M and N are integers of not less than 2. Furthermore, m used hereinafter indicates an arbitrary integer of not less than 1 nor more than M, and n an arbitrary integer of not less than 1 nor more than N.

The light output portion 10 has M×N light sources $10_{1,1}$-$10_{M,N}$. Each light source $10_{m,n}$ preferably outputs light having the center wavelength in the center wavelength range of 200 nm to 600 nm. The light is further preferably a laser beam. Here, the center wavelength is a center wavelength in a wavelength width, and the wavelength width is a half-width.

A light source with semiconductor device can be applied as the light source $10_{m,n}$. The light source $10_{m,n}$ can be selected from laser diodes (LDs), light emitting diodes (LEDs), LD pumped solid-state lasers, and so on. When the center wavelength is not more than 550 nm, a variety of light emitting diodes can be used, which can achieve high efficiency of light emission, long lifetime, and miniaturization of the apparatus. When the center wavelength is not less that 390 nm and not more than 420 nm, a laser diode of the center wavelength of 400 nm which is used and mass-produced as a light source for a digital video disk of high density recording type. In addition, when the center wavelength is not less than 370 nm, the light is a visible light. Therefore, irradiation condition, (i.e. a position of the light, a beam diameter and so on) can be readily checked by eye or a camera for visible light.

An example of the laser diodes is a blue-violet laser of the wavelength of 400 nm. Examples of the light emitting diodes include a GaN LED of the wavelength of 430 nm, an InGaN LED of the wavelength of 500 nm, a GaP LED of the wavelength of 550 nm, and so on. Examples of the LD pumped solid-state lasers include an Nd-YAG third harmonic laser of the wavelength of 355 nm, an Nd-YAG second harmonic laser of the wavelength of 532 nm, and so on. Examples of the other light sources include an He—Cd gas laser of the wavelength of 442 nm, an Ar+ gas laser of the wavelength of 488 nm or 515 nm, a KrF excimer laser of the wavelength of 248 nm, an XeCl excimer laser of the wavelength of 308 nm, and so on.

When the laser diode is used as the light source $10_{m,n}$, the metal heating apparatus of high-power, a simple cooling device, and a small size can be provided. When the light emitting diode is used as the light source, high efficiency of light emission is achieved, and therefore the metal heating apparatus of low running cost and low apparatus cost can be provided. When the LD pumped solid-state laser is used as the light source, the metal heating apparatus of substantially high power can be provided.

In addition, a fiber type light source in which a light diode for excitation and an optical fiber is combined can be used, such as a fiber laser and a ASE light source.

The light guide portion 30 has M×N optical fibers $30_{1,1}$-$30_{M,N}$. Each lens $20_{m,n}$ condenses light outputted from a corresponding light source $10_{m,n}$ and injects the light into an entrance end of a corresponding optical fiber $30_{m,n}$. Each optical fiber $30_{m,n}$ functions to guide the light outputted from the corresponding light source $10_{m,n}$, and is adapted to receive the light condensed by the corresponding lens $20_{m,n}$, through its entrance end and to guide the light to output it from its exit end. At the exit end of each optical fiber $30_{m,n}$, it is preferable to provide a condensing optical system such as a lens for collimating or converging the light emerging from the exit end.

Figure 2:
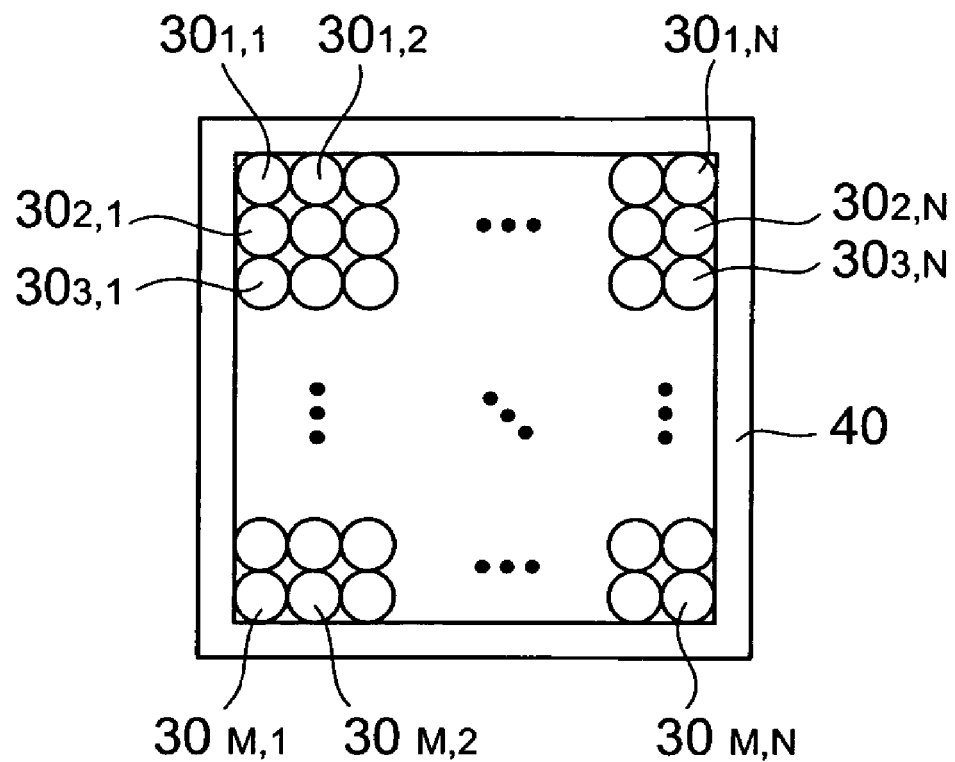
FIG. 2 is an illustration to illustrate an array of exit ends of M×N optical fibers in the metal heating apparatus according to the first embodiment.
Figure 14:
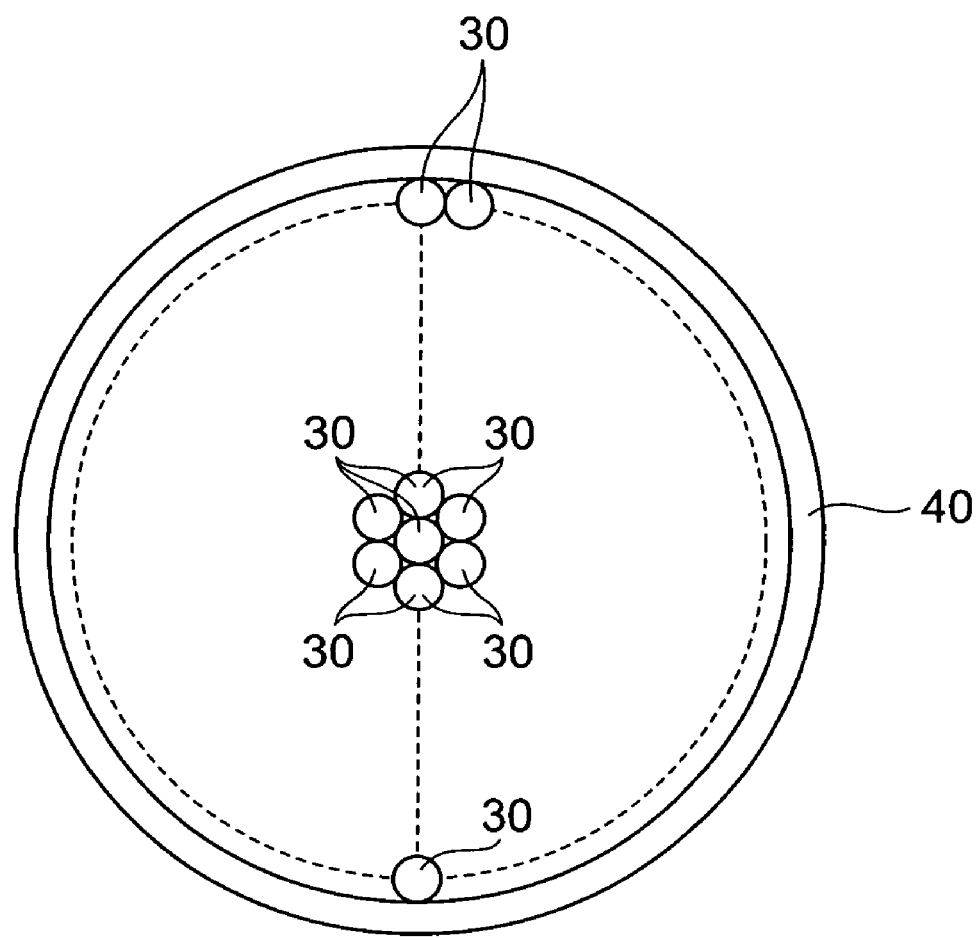
FIG. 14 is an illustration to illustrate another array of exit ends of optical fibers.
Figure 15:
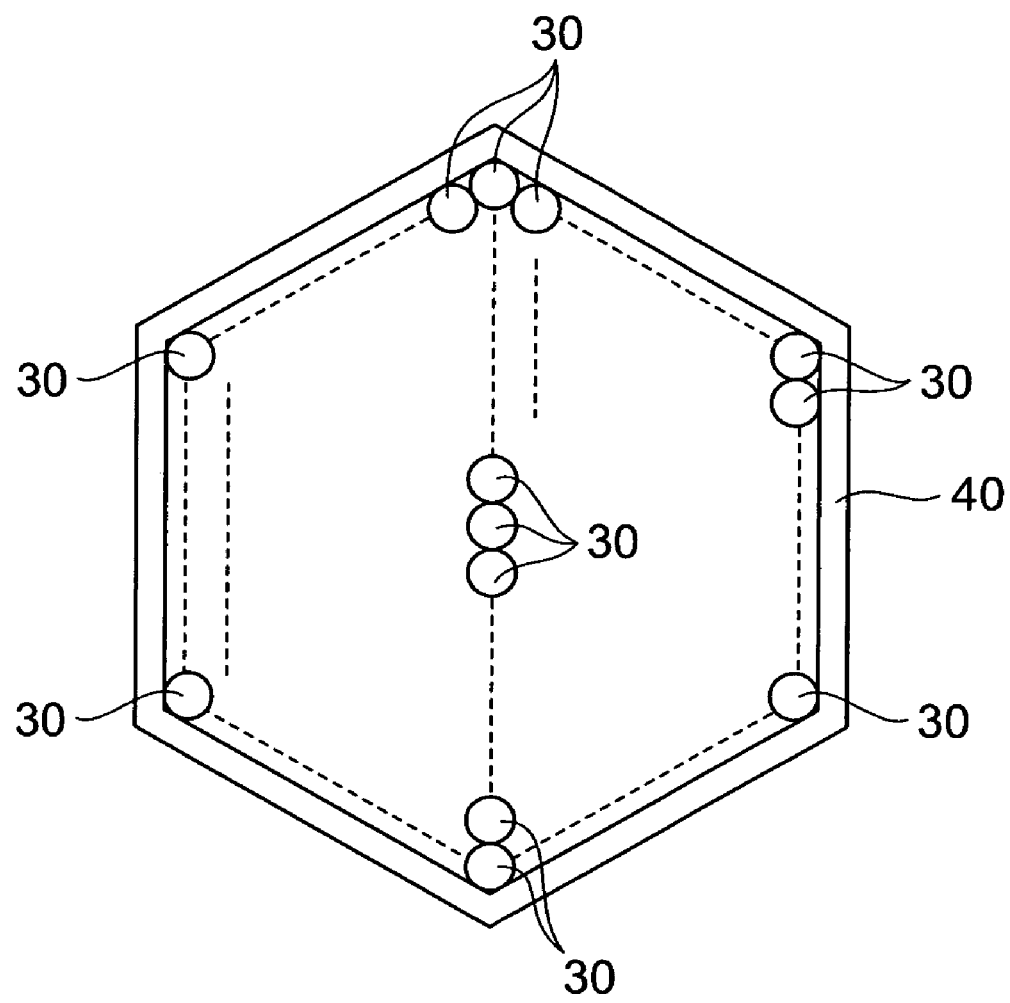
FIG. 15 is an illustration to illustrate another array of exit ends of optical fibers.

The securing member 40 is a member for securing the arrangement of exit ends of the respective M×N optical fibers $30_{1,1}$ to $30_{M,N}$ This securing member 40 keeps the exit ends of the respective M×N optical fibers $30_{1,1}$ to $30_{M,N}$ in a two-dimensional array. FIG. 2 is an illustration to illustrate the array of exit ends of the respective MXN optical fibers $30_{1,1}$ to $30_{M,N}$ in the metal heating apparatus according to the first embodiment. As shown in this illustration, each optical fiber $30_{m,n}$ is located in the mth row and the nth column in the two-dimensional array. It should be noted that the plurality of the optical fibers can be arrayed in a circle shape as shown in FIG. 14, or can be arrayed in a polygon such as a hexagonal shape shown in FIG. 15.

The controller 50 individually controls output operations of the respective M×N light sources $10_{1,1}$ to $10_{M,N}$. For example, the controller 50 may control the magnitude of a drive current or a supply time of the drive current to each light source $10_{m,n}$, or may control the level of optical coupling to the optical fiber $30_{m,n}$ by means of a modulator.

This metal heating apparatus 1 operates as follows. When all or one or more of the M×N light sources $10_{1,1}$ to $10_{M,N}$ emit light, the light emitted from each light source $10_{m,n}$ is condensed by the lens $20_{m,n}$ to enter the entrance end of optical fiber $30_{m,n}$ and is guided by optical fiber $30_{m,n}$ to be outputted from the exit end of optical fiber $30_{m,n}$ to the outside.

The light emerging from the exit end of each optical fiber $30_{m,n}$ is the light emitted from each light source $10_{m,n}$ and injected into the entrance end of optical fiber $30_{m,n}$. As the controller 50 individually controls the output operations of the respective M×N light sources $10_{1,1}$, to $10_{M,N}$, the power of the light emerging from the exit end of each optical fiber $30_{m,n}$ is regulated thereby. Then the output light is applied onto a metal member, so as to heat the metal member.

In the present embodiment, since the power of the light emerging from the exit end of each optical fiber $30_{m,n}$ can be individually regulated, it is feasible to selectively apply the light onto a position to be heated and to suppress unwanted light irradiation on the other region. Since degrees of freedom are high for change of the light irradiation position, it is possible to continuously heat a plurality of components with different positions to be heated.

Figure 4:
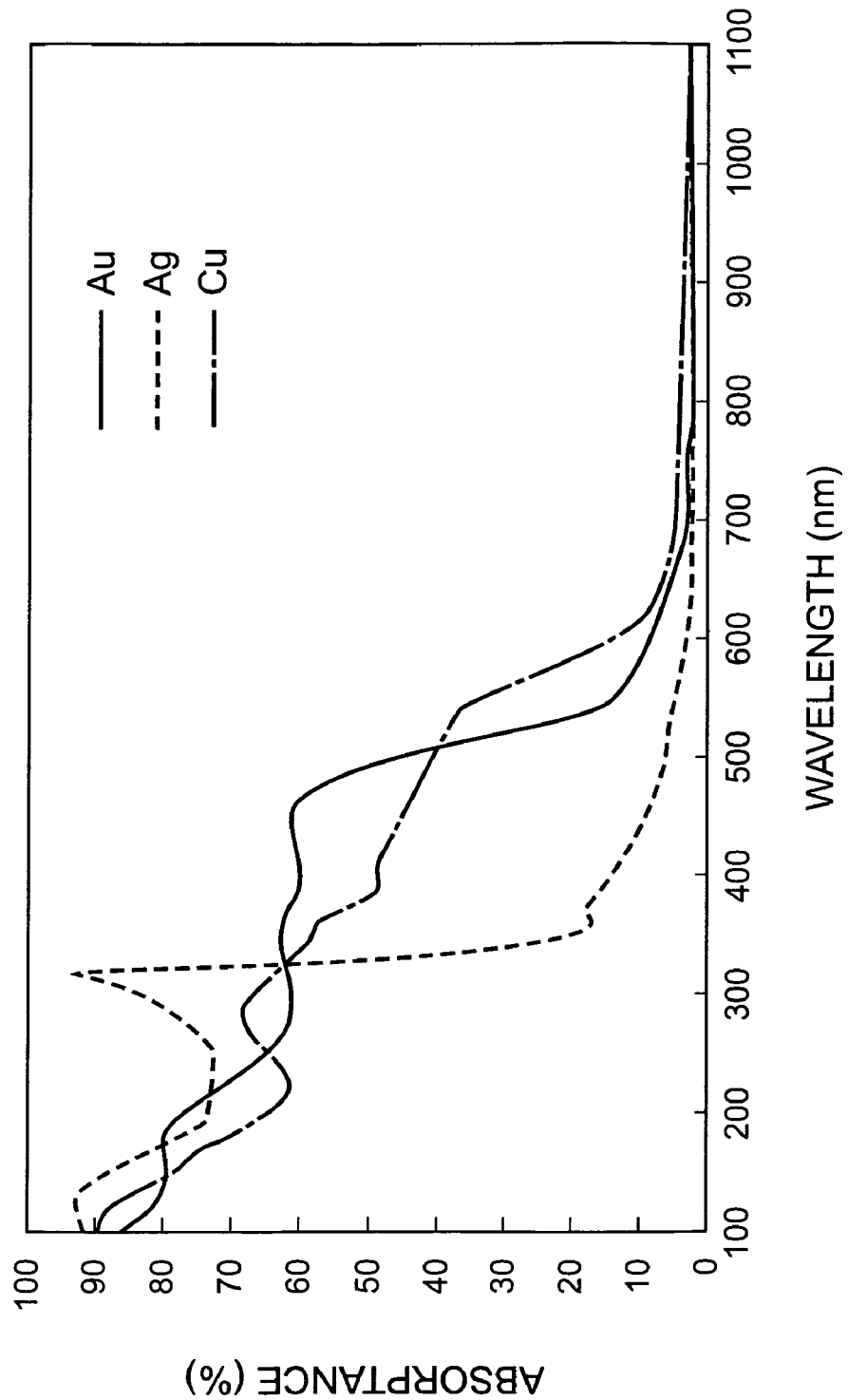
FIG. 4 is a graph showing the wavelength dependence of absorptance of gold, silver and copper.

Since the center wavelength of the light applied onto the metal member is in the center wavelength range of 200 nm to 600 nm, the present embodiment achieves high efficiency of heating the metal member containing gold. FIG. 4 is a graph showing the wavelength dependence of absorptance of gold, silver, and copper. Here the absorptance has the relation substantially equivalent to (1-reflectance).

Where a metal member containing gold is heated using infrared laser light (at the wavelength of 800 nm to 1100 nm) as in the prior art, the efficiency of heating the metal member containing gold is low because the reflectance of gold for the infrared laser light is high as shown in FIG. 4. Therefore, the metal member containing gold cannot be efficiently heated by the infrared laser light.

In contrast to it, the metal heating apparatus 1 of the first embodiment applies the light at the wavelength in the range of 200 to 600 nm where the reflectance of gold is low, onto the metal member containing gold, whereby the metal member can be efficiently heated. That is, at the center wavelength of 800 nm to 1100 nm, absorptance of gold is not more than 3% and is low. On the other hand, at the center wavelength of not more than 600 nm, absorptance of gold is over 10% (three times). Therefore, high efficiency of heating can be achieved. In addition, at the center wavelength of not more than 480 nm, absorptance of gold is 60%, and is the highest level in the visible region. Therefore, further high efficiency of heating can be achieved.

Figure 5:
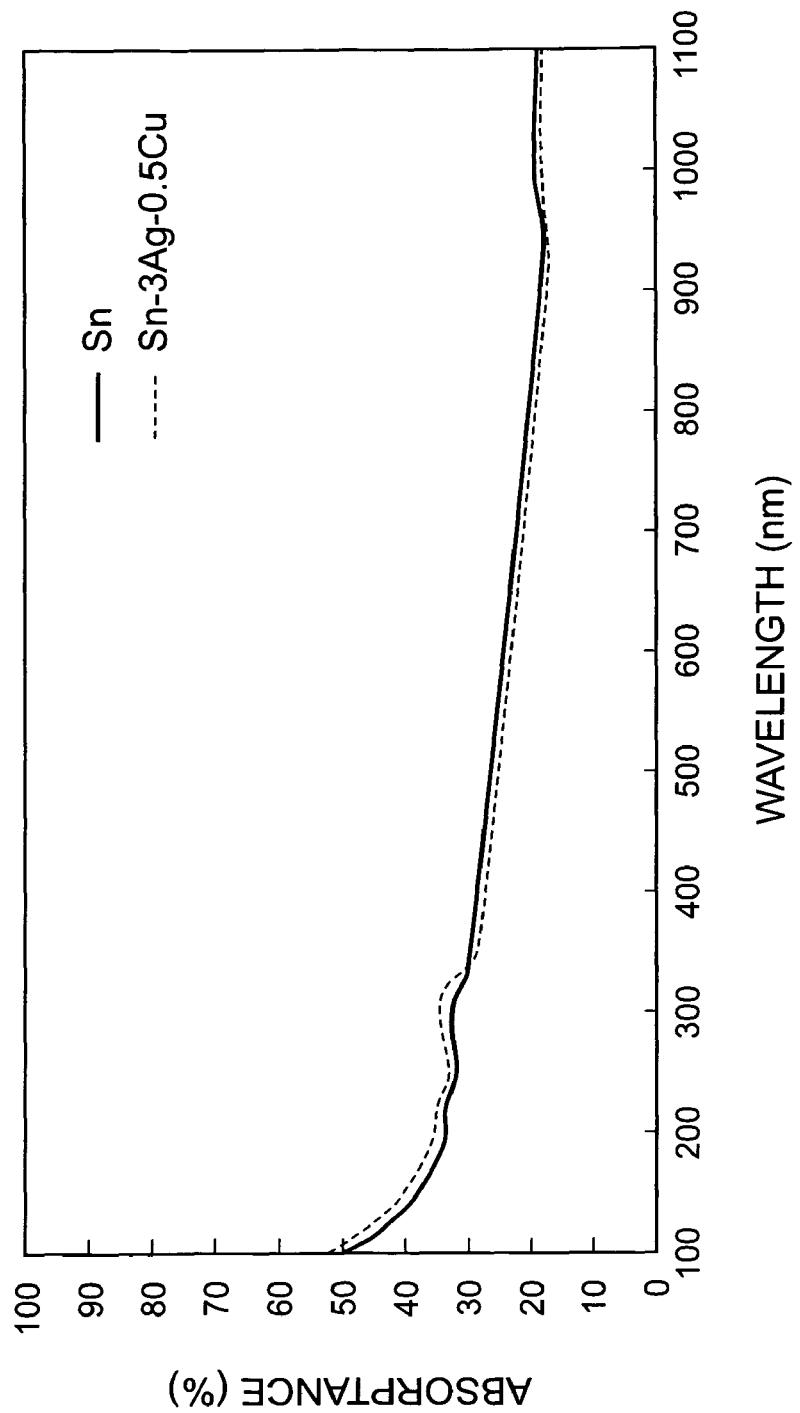
FIG. 5 is a graph showing the wavelength dependence of absorptance of tin.

When the metal heating apparatus 1 is used in soldering with a solder containing tin on a metal member containing gold, it can improve the yield and reliability of soldering. FIG. 5 is a graph showing the wavelength dependence of absorptance of tin. As shown in FIGS. 4 and 5, the absorptance of tin, or metal containing tin is lower than that of gold for light in the wavelength range of 200 to 600 nm. Namely, where the light in the foregoing wavelength range is applied, the temperature rise rate of gold is larger than that of tin. Accordingly, when the light in the above wavelength range is applied onto the metal member with the solder supplied thereon, the metal member is heated ahead and the part of the solder in contact with the metal member is first melted. This results in improving the yield and reliability of soldering. More specially, at the center wavelength of not more than 550 nm, absorptance of gold is greater than that of tin (25%), and thus temperature rise rate of gold is larger than that of tin. Therefore, high reliability of soldering can be achieved.

In addition, as shown in FIG. 5, absorptance of silver (Ag) is 3% and low at the center wavelength of not less than 800 nm. On the other hand, at the center wavelength of not more than 420 nm, the absorptance is over 10% (three times), and therefore high efficiency of heating the silver can be achieved.

Furthermore, as shown in FIG. 5, absorptance of copper (Cu) is 5% and low at the center wavelength of not less than 800 nm. On the other hand, at the center wavelength of not more than 600 nm, the absorptance is over 15% (three times), and therefore high efficiency of heating the silver can be achieved. At the center wavelength of not more than 500 nm, the absorptance is over 40% and is the highest level in the visible region. Therefore, further high efficiency of heating can be achieved.

Second Embodiment

Figure 3:
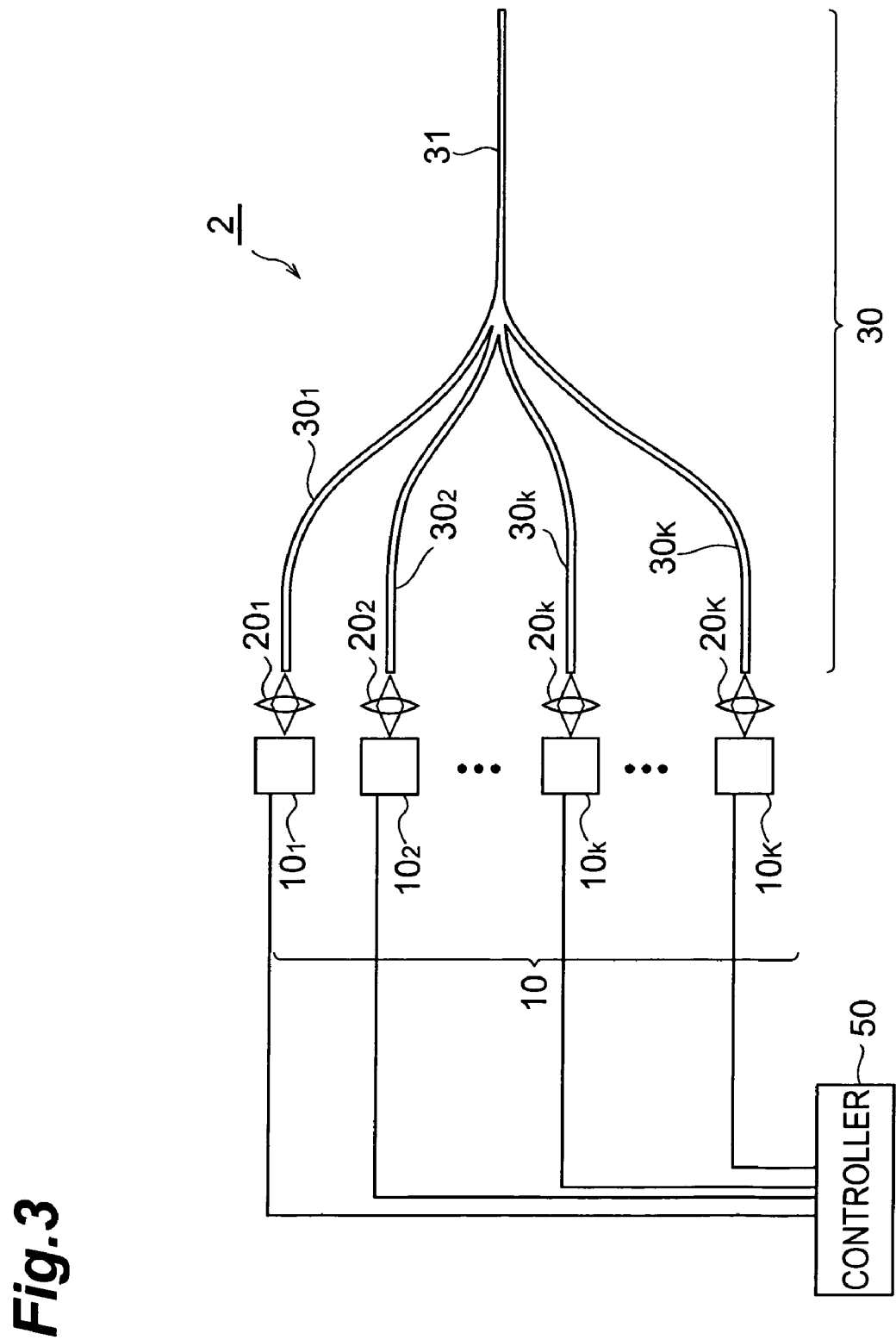
FIG. 3 is a configuration diagram of a metal heating apparatus according to the second embodiment.

Next, the second embodiment of the present invention will be described. FIG. 3 is a configuration diagram of a metal heating apparatus according to the second embodiment. The metal heating apparatus 2 shown in this figure has a light output portion 10, K lenses $20_1$ to $20_K$, a light guide portion (light guiding means) 30, and a controller 50. Here K is an integer of not less than 2. Furthermore, k used hereinafter indicates an arbitrary integer of not less than 1 nor more than K.

The light output portion 10 has K light sources $10_1$ to $10_K$. Each light source $10_k$ preferably outputs light having the center wavelength in the wavelength range of 200 nm to 600 nm. The light is further preferably a laser beam. Each light source $10_k$ can be one similar to the aforementioned light source $10_{m,n}$.

The light guide portion 30 has K optical fibers $30_1$ to $30_K$, and one optical fiber 31. Each lens $20_k$ condenses light emitted from a corresponding light source $10_k$ and injects the light into an entrance end of a corresponding optical fiber $30_k$. Each optical fiber $30_k$ functions to guide the light emitted from the corresponding light source $10_k$, and is adapted to receive the light condensed by the corresponding lens $20_k$, through its entrance end and to guide the light to output it from its exit end.

The entrance end of optical fiber 31 is optically coupled to the exit ends of the respective K optical fibers $30_1$ to $30_K$. The optical fiber 31 receives light emerging from the exit ends of the respective K optical fibers $30_1$ to $30_K$ through its own entrance end and further guides the light to output it from the exit end. At the exit end of the optical fiber 31, it is preferable to provide a condensing optical system such as a lens for collimating or converging the light emerging therefrom.

The controller 50 individually controls output operations of the respective K light sources $10_1$ to $10_K$. For example, the controller 50 may control the magnitude of a drive current supplied to each light source $10_k$ or may control the level of optical coupling to optical fiber $30_k$ by means of a modulator.

This metal heating apparatus 2 operates as follows. When all or one or more of the K semiconductor laser light sources $10_1$ to $10_K$ emit light, the light emitted from each light source $10_k$ is condensed by the lens $20_k$ to enter the entrance end of optical fiber $30_k$, and the light is guided by optical fiber $30_k$ and further guided by optical fiber 31 to be outputted from the exit end of optical fiber 31 to the outside.

The light emerging from the exit end of this optical fiber 31 is multiplexed light beams emitted from the respective light sources $10_k$ and injected into the entrance ends of the corresponding optical fibers $30_k$. Therefore, when the controller 50 individually controls the output operations of the K light sources $10_1$ to $10_K$, the power of the light emerging from the exit end of the optical fiber 31 is regulated thereby. Then this output light is applied onto a metal member, so as to heat the metal member.

Since in the present embodiment the apparatus can appropriately control the power of the light outputted from the exit end of the optical fiber 31, it can apply the light in the power necessary for the heating of the metal member, onto the solder and reduce unwanted heating in the other region. Since the drive currents of the individual light sources can be decreased, it is feasible to reduce the frequency of failure of the light sources.

The metal heating apparatus 2 is also able to efficiently heat a member containing gold as the metal heating apparatus 1 was. Furthermore, the metal heating apparatus 2, similar to the metal heating apparatus 1, can improve the yield and reliability of soldering when applied to soldering with a solder containing tin to a metal member containing gold.

Third Embodiment

Figure 6:
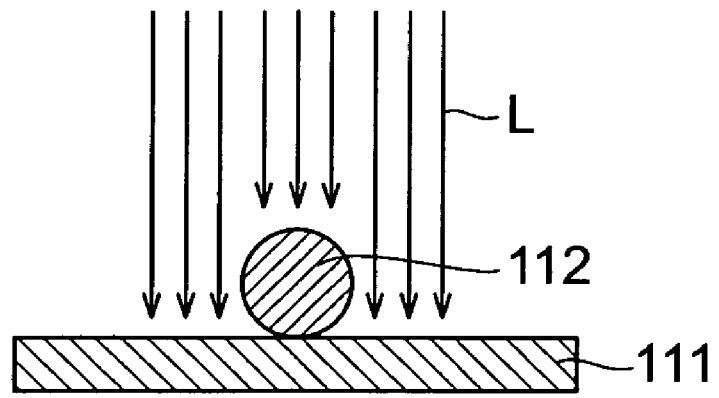
FIG. 6 is an illustration to illustrate a metal heating method according to the third embodiment.

The third embodiment of the present invention will be described below. FIG. 6 is an illustration to illustrate a soldering method according to the third embodiment. A metal heating method according to the third embodiment is a method of supplying a solder (second metal member) 112 onto a metal member (first metal member) 111 and melting the solder 112 on the metal member 111 to effect soldering. In this metal heating method, laser light L is applied onto both of the metal member 111 and solder 112 or onto the metal member 111 only. When the laser light L is applied in this manner, it first melts the part facing the metal member 111, in the solder 112 placed on the metal member 111, i.e., the part of the solder 112 in contact with the metal member 111. The yield and reliability of soldering are enhanced when the part facing the metal member 111, in the solder 112 placed on the metal member 111 is melted ahead of the part opposite to the facing part, as described above.

In this metal heating method, it is preferable to apply the laser light L of the wavelength at which the reflectance of the solder 112 is larger than that of the metal member 111. As seen from the wavelength dependences of absorptance of gold and tin in FIGS. 4 and 5, the absorptance of gold is higher than that of tin at the wavelengths of not more than 550 nm. Therefore, a preferred case is such that the metal member 111 is a material containing gold as a primary component and the solder 112 a material containing tin as a primary component and that the wavelength of the laser light L is not more than 550 nm. This is advantageous in that the temperature rise rate of the metal member 111 is larger than that of the solder 112, so as to first melt the part of the solder 112 facing the metal member 111. In this case, the metal member 111 and the solder 112 are compatible with each other in soldering. In recent years, from environmental consideration, solders primarily containing tin (Sn.3Ag.0.5Cu) are increasingly used in place of solders containing lead.

Figure 7:
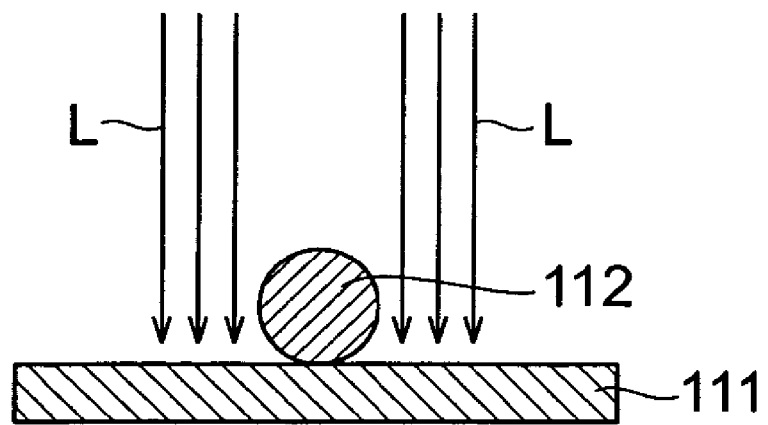
FIG. 7 is an illustration to illustrate a modification example of the metal heating method according to the third embodiment.

It is also preferable to apply the laser light L so that the laser light irradiation area on the metal member 111 is larger than the laser irradiation area on the solder 112. As shown in FIG. 7, it is also preferable to apply the laser light L onto the metal member 111 only. In this case, since the absorptance of gold is large at the wavelengths of less than 600 nm as shown in FIGS. 4 and 5, a preferred case is such that the metal member 111 is a material containing gold as a primary component and that the wavelength of the laser light L is less than 600 nm. This case is also advantageous in that the temperature rise rate of the metal member 111 is larger than that of the solder 112, so as to first melt the part of the solder 112 facing the metal member 111.

It is also preferable to apply the laser light L so that the energy deposition amount to the metal member 111 is larger than that to the solder 112. Here the energy deposition amount is expressed by the product of irradiation energy and absorptance. The energy deposition amount to each of the metal member 111 and the solder 112 can be controlled by controlling one of each laser beam reflectance (i.e., the wavelength of the laser light L), each laser irradiation intensity, each laser irradiation range, and so on. This case is also advantageous in that the temperature rise rate of the metal member 111 is larger than the temperature rise rate of the solder 112, so as to first melt the part of the solder 112 facing the metal member 111.

Fourth Embodiment

Figure 8:
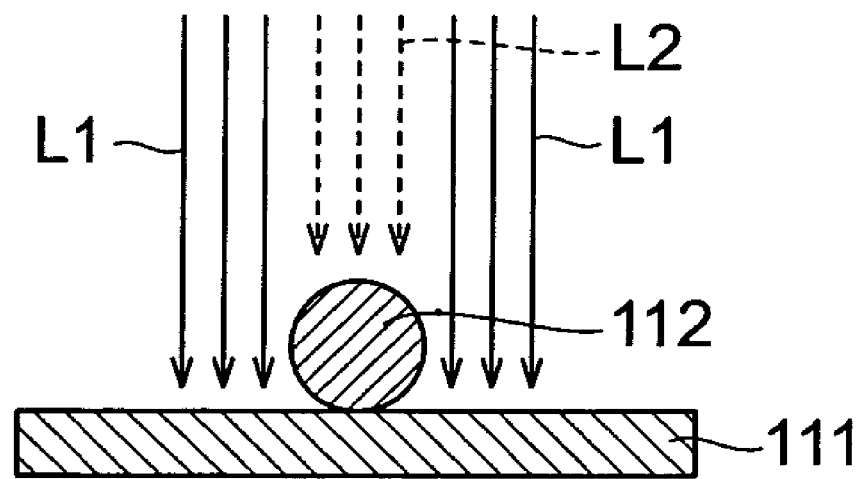
FIG. 8 is an illustration to illustrate a metal heating method according to the fourth embodiment.

Next, the fourth embodiment of the present invention will be described. FIG. 8 is an illustration to illustrate a metal heating method according to the fourth embodiment. The metal heating method according to the fourth embodiment is a method of supplying a solder (second metal member) 112 onto a metal member (first metal member) 111 and melting the solder 112 on the metal member 111 to effect soldering, and laser beams L1, L2 are applied onto the metal member 111 or onto the solder 112. When the laser beams L1, L2 are applied in this manner, the light first melts the part facing the metal member 111, in the solder 112 placed on the metal member 111, i.e., the part of the solder 112 in contact with the metal member 111. Since the part facing the metal member 111, in the solder 112 placed on the metal member 111 is melted ahead of the part opposite to the facing part in this manner, the yield and reliability of soldering are enhanced thereby.

The metal heating method of the fourth embodiment is characterized in that the laser beam L1 of the first center wavelength and the laser beam L2 of the second center wavelength are used as laser light applied onto the metal member 111 or onto the solder 112.

Figure 9:
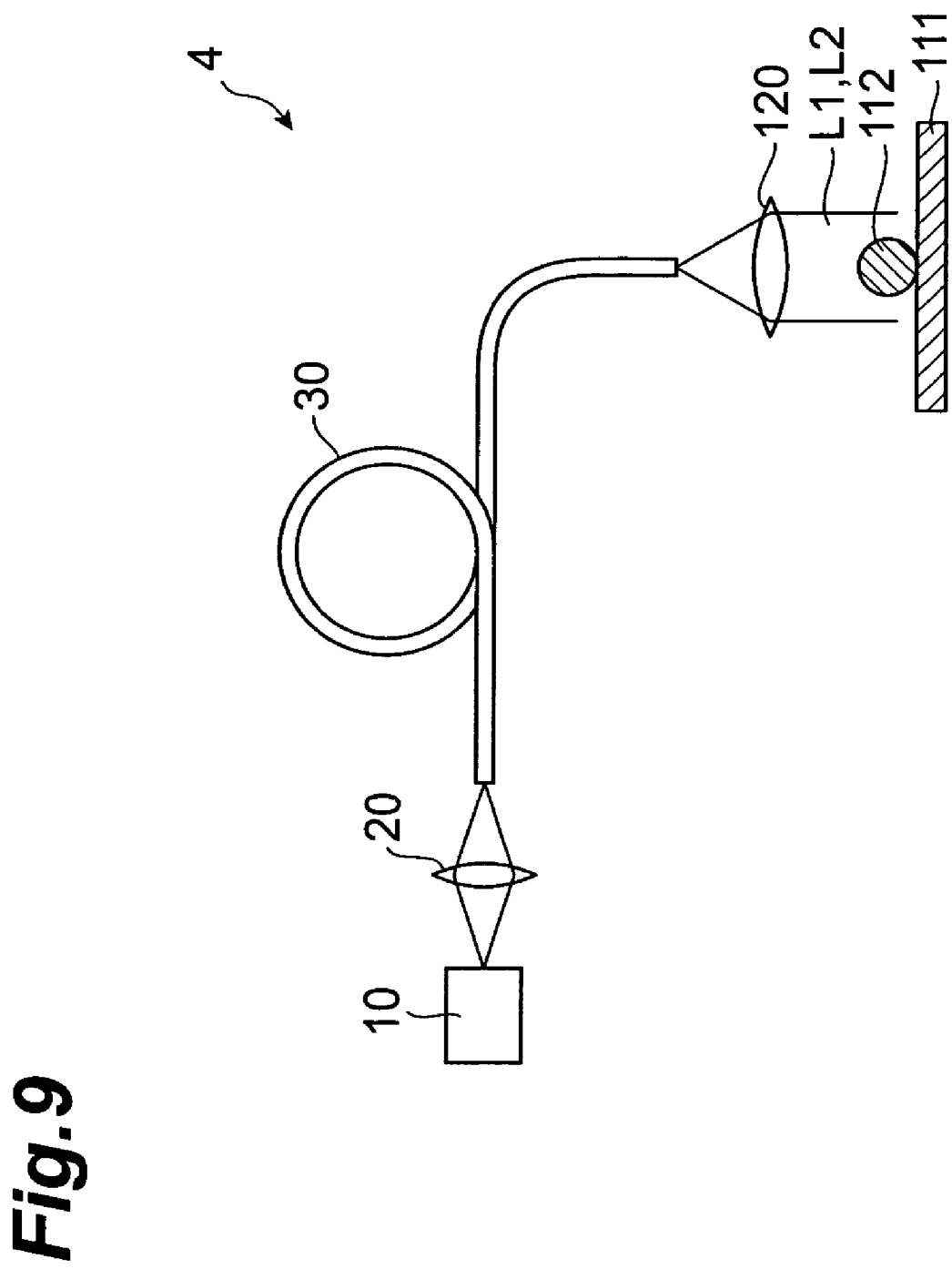
FIG. 9 is an illustration showing an example of a configuration of a soldering apparatus preferably used in the metal heating method according to the fourth embodiment.

FIG. 9 is an illustration showing an example of a configuration of a metal heating apparatus suitably used in the metal heating method of the fourth embodiment. In the metal heating apparatus 4 shown in this figure, the laser beams L1, L2 are outputted from a light output portion 10 to pass through a coupling optical system (lens) 20 and then enter one end of a light guide portion (optical fiber) 30. They are guided by this light guide portion 30 and thereafter outputted from the other end of the light guide portion 30. They are then condensed or collimated by a lens 120 to be applied onto the metal member 111 or onto the solder 112. It is preferable that the laser beams L1, L2 be outputted from a common exit position, as described above. This can substantialize a simple and inexpensive optical system for guiding or applying the laser beams L1, L2 onto the metal member 11 or onto the solder 12.

Figure 10:
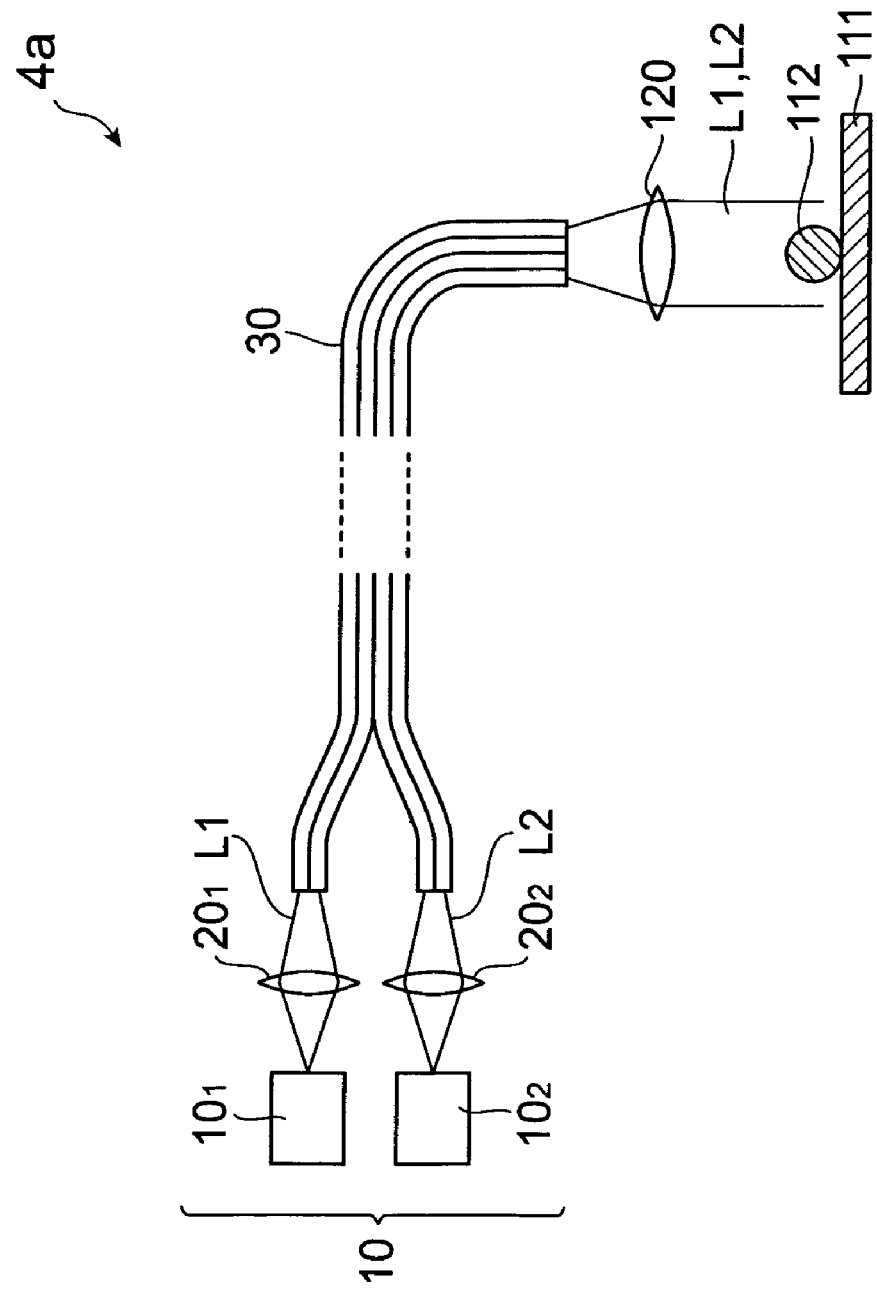
FIG. 10 is an illustration showing another example of a configuration of a metal heating apparatus preferably used in the metal heating method according to the fourth embodiment.

FIG. 10 is an illustration showing another example of a configuration of a metal heating apparatus suitably used in the metal heating method of the fourth embodiment. The metal heating apparatus 4a shown in this figure has the same configuration as the metal heating apparatus 1 shown in FIG. 1, except that the metal heating apparatus 4a has a lens 120. In this metal heating apparatus 4a, the light output portion 10 has a plurality of light sources $10_k$, some of which emit a laser beam L1 of a first center wavelength and others of which emit a laser beam L2 of a second center wavelength. Here k is an integer of not less than 1 and FIG. 10 shows an example wherein k is 1 and 2.

One laser beam L1 is emitted from the light source $10_1$ of the light output portion 10, passes through a coupling optical system (lens) $20_1$, and is then injected into one end of a bundle fiber as a light guide portion 30. The other laser beam L2 is emitted from the light source $10_2$, passes through a coupling optical system (lens) $20_2$, and is injected into one end of the bundle fiber as the light guide portion 30. The laser beams L1, L2 injected into one end of the bundle fiber 30 are guided by the bundle fiber 30, thereafter outputted from the other end of the bundle fiber 30, condensed or collimated by the lens 120, and applied onto the metal member 111 or onto the solder 112.

By using the bundle fiber 30 as shown in this FIG. 10, it becomes easy to output the laser beams L1, L2 from mutually different exit positions of the bundle fiber 30 and to apply them onto the metal member 111 or onto the solder 112. It also becomes easy to apply the laser beam L1 so that the laser irradiation area on the metal member 111 is larger than that on the solder 112 and to apply the laser beam L2 so that the laser irradiation area on the solder 112 is larger than that on the metal member 111. This makes the irradiation with the laser beam L1 dominant in the temperature rise of the metal member 111 and makes the irradiation with the laser beam L2 dominant in the temperature rise of the solder 112, so that optimal soldering can be performed by controlling any one of the wavelengths of the respective laser beams L1, L2, the irradiation intensities, the irradiation ranges, and so on. By using the bundle fiber 30, it is feasible to construct a simple and inexpensive optical system for guiding or applying the laser beams L1, L2 onto the metal member 111 or onto the solder 112.

The center wavelengths of the respective laser beams L1, L2 are preferably a wavelength width or more different from each other, or preferably 100 nm or more different from each other. Efficient soldering can be conducted by using the laser beams L1, L2 with their respective center wavelengths different from each other as described above and by properly setting various conditions in the application thereof onto the metal member 111 or onto the solder 112.

Preferably, the metal member 111 is a material containing gold as a primary component and the wavelength of the laser beam L1 is less than 600 nm. In addition, preferably, the solder 112 is a material containing tin as a primary component and the wavelength of the laser beam L2 is not less than 600 nm. In this configuration, the metal member 111 and the solder 112 are compatible with each other in soldering. Since the reflectance of gold is low at the wavelengths of less than 600 nm as shown in FIGS. 4 and 5, the metal member 111 can be efficiently heated by applying the laser beam L1 of the wavelength of less than 600 nm onto the metal member 111 containing gold as a primary component. Since a relatively inexpensive light source with high output power (e.g., a semiconductor laser light source with the output wavelength of 800 nm, a YAG laser light source with the output wavelength of 1064 nm, etc.) is available as the light source $10_k$ for outputting the laser beam L2 of the wavelength of not less than 600 nm and since the wavelength dependence of reflectance of tin is insignificant as shown in FIGS. 4 and 5, the application of the laser beam L2 of the wavelength of not less than 600 nm is advantageous to the solder 112 containing tin as a primary component.

Figure 16:
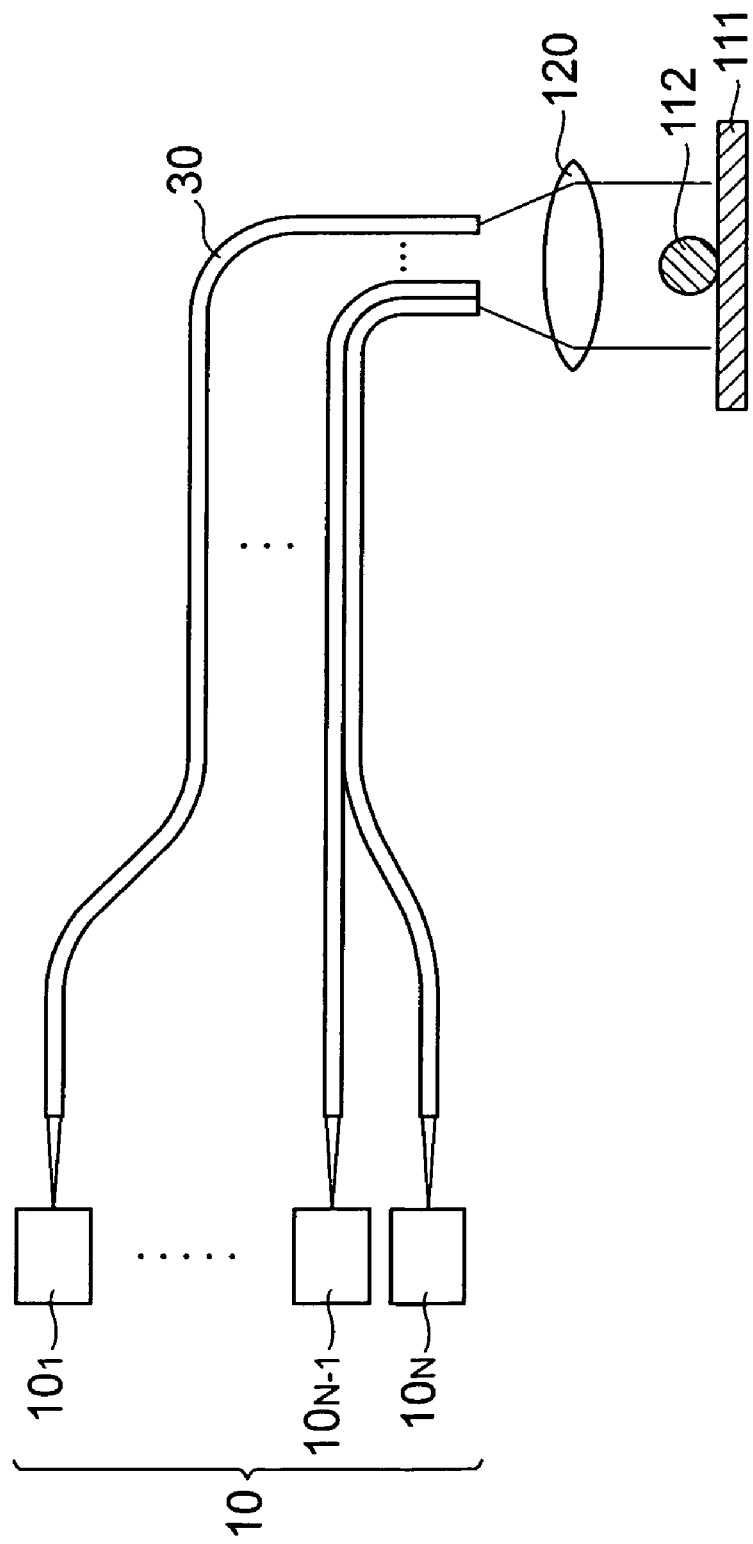
FIG. 16 is an illustration showing another example of a configuration of a soldering apparatus preferably used in the metal heating method according to the fourth embodiment.
Figure 17:
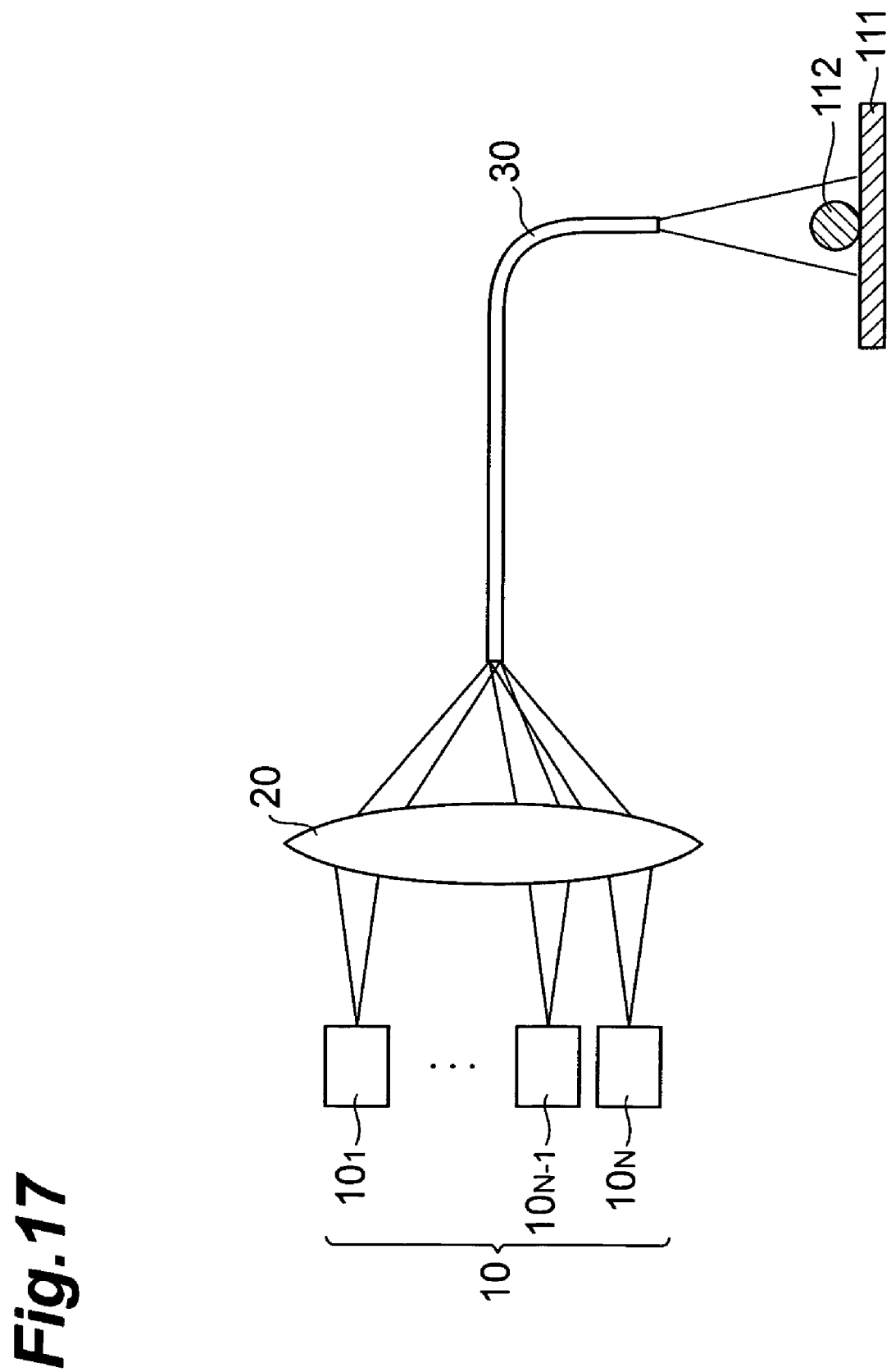
FIG. 17 is an illustration showing another example of a configuration of a soldering apparatus preferably used in the metal heating method according to the fourth embodiment.
Figure 18:
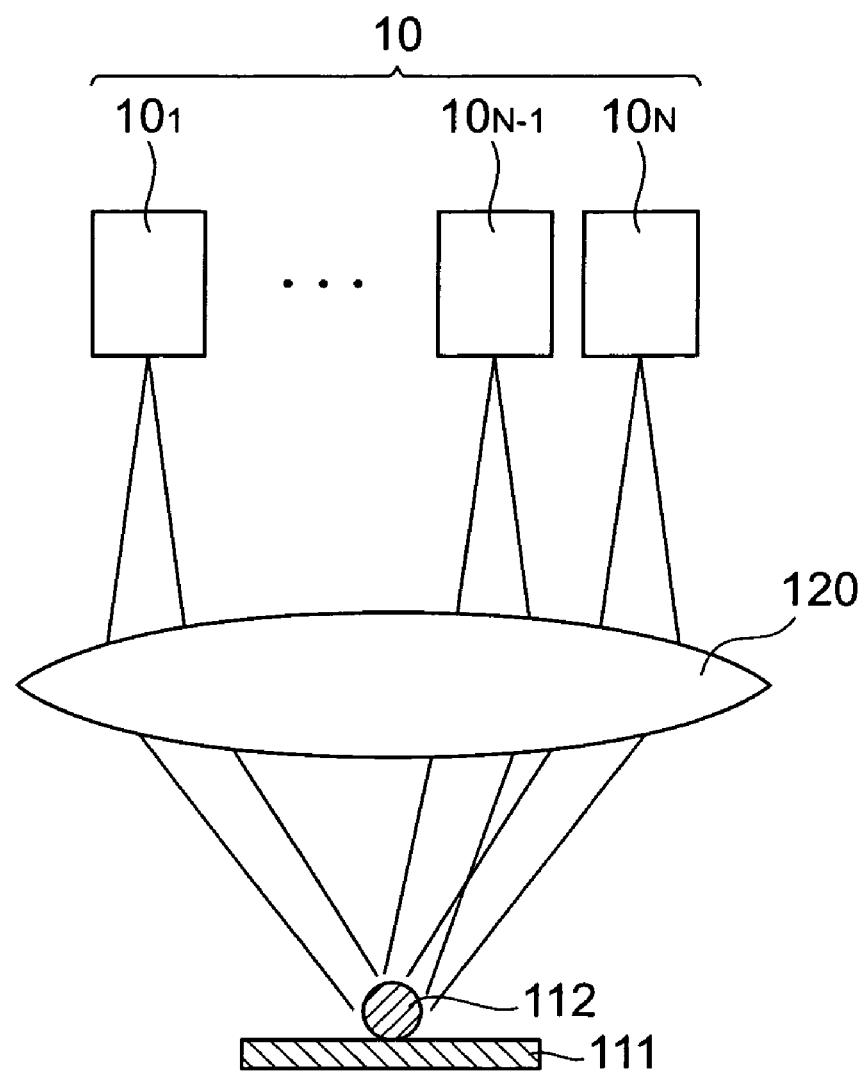
FIG. 18 is an illustration showing another example of a configuration of a soldering apparatus preferably used in the metal heating method according to the fourth embodiment.
Figure 19:
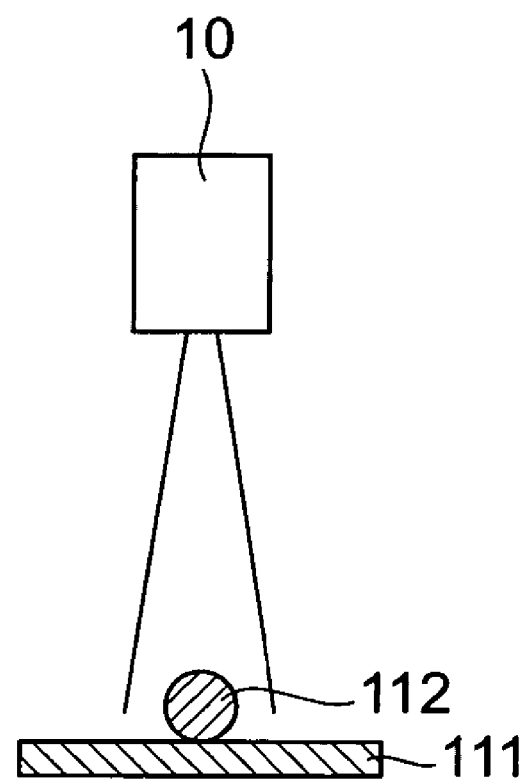
FIG. 19 is an illustration showing another example of a configuration of a soldering apparatus preferably used in the metal heating method according to the fourth embodiment.

When the laser light from the light source $10_k$ enters the fiber 30 sufficiently, the lens $20_k$ can be omitted as shown in FIG. 16. As shown in FIG. 17, a single lens 20 may guide the laser light from the light source $10_k$ to the fiber 30. As shown in FIG. 18, the lens 120 may condense the laser light and irradiates the condensed light without the fiber. As shown in FIG. 19 the light source $10_k$ may irradiate the light directly.

Fifth Embodiment

Figure 11:
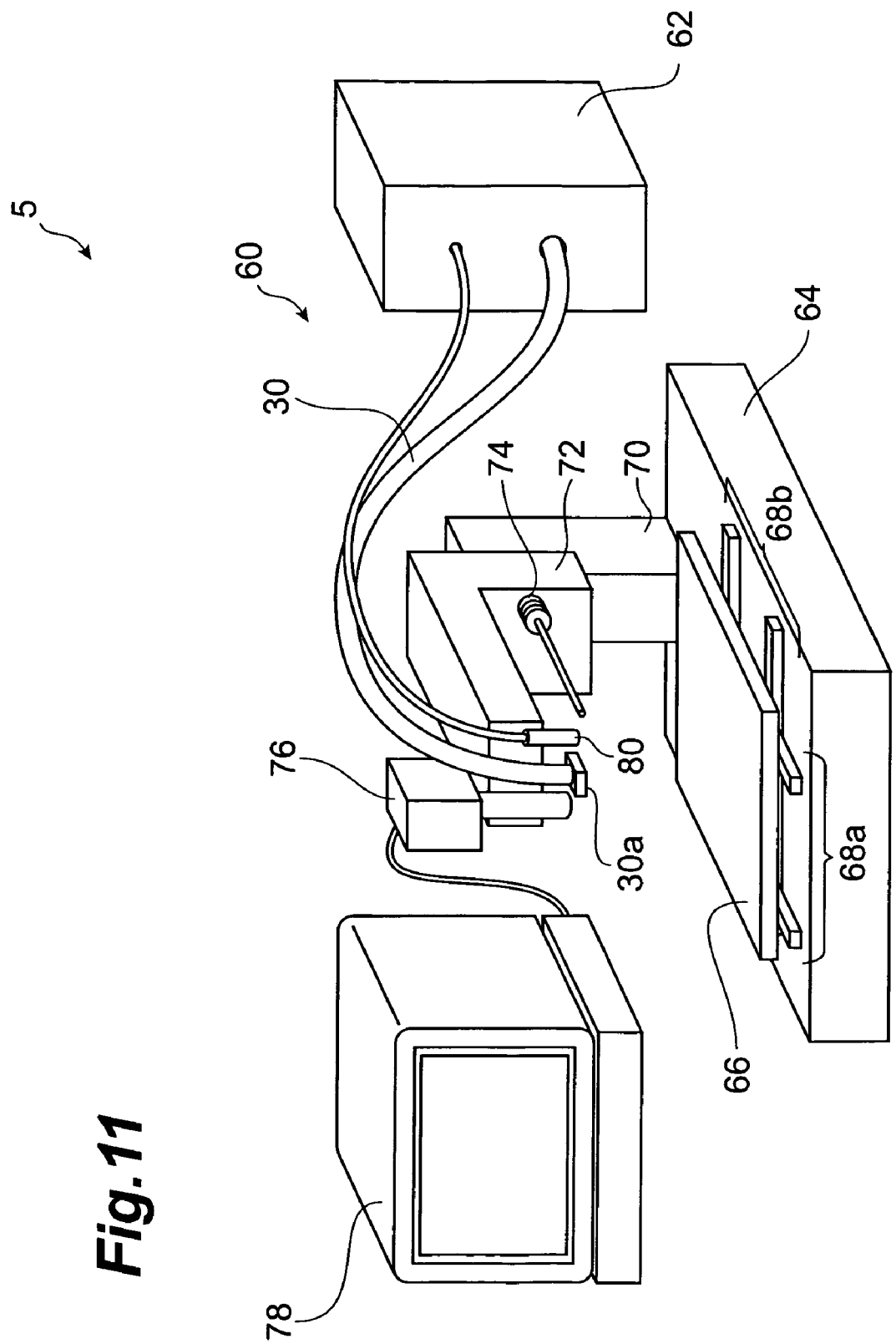
FIG. 11 is a perspective view schematically showing a metal heating apparatus of the fifth embodiment.

The fifth embodiment of the present invention will be described below. FIG. 11 is a perspective view schematically showing a metal heating apparatus of the fifth embodiment. The metal heating apparatus 5 shown in this figure can use the aforementioned metal heating apparatus 1, 2, 4, or 4a as a light source apparatus 60. The light source apparatus 60 has a module 62 incorporating the light output portion 10 and controller 50, and the light guide portion 30 is connected to the module 62.

The metal heating apparatus 5 has a base 64, a first stage (mounting means) 66, guides (guide means) 68a and 68b, a support column 70, a second stage 72, a solder supply unit 74, a camera (image taking means) 76, and a monitor 78.

The base 64 supports the first stage 66 through the guides 68a and 68b. The first stage 66 is disposed along a plane with which light from the exit end 30a of the light guide portion 30 intersects. The first stage 66 is movable as guided by the guides 68a and 68b in two directions intersecting with the optical axis of the light. The apparatus may also be provided with a driving system such as a step motor for moving the first stage 66.

The support column 70 is supported on the base 64 and extends in the same direction as the aforementioned optical axis. The second stage 72 is supported on the support column 70 and is movable along the support column 70. The apparatus may also be provided with a driving system with an air cylinder or the like for moving the second stage 72.

The solder supply unit 74 is a unit for supplying a solder onto a metal member mounted on the first stage 66, and can supply a solder string wound around a reel, onto the metal member.

The camera 76 takes an image of a region on the first stage 66 and outputs the image to the monitor 78. Therefore, an image of a metal member mounted on the first stage 66 is displayed on the monitor 78.

The metal heating apparatus 5 may be provided with a temperature sensor 80 for measuring the temperature of the region on the first stage 66. In this case, the output from the temperature sensor 80 is fed to the controller 50, and the optical output from the light output portion 10 is controlled based thereon. The temperature sensor 80 is preferably an apparatus which can measure two-dimensional temperature distribution, such as a infrared light CCD camera. In this case, the controller 50 controls outputs of the plurality of the light sources individually on the basis of the result of measuring the temperature distribution, whereby it is possible to heat so as to achieve the optimal temperature distribution of target.

The following will describe the operation of the metal heating apparatus 5, using an example in which the metal heating apparatus 5 has the metal heating apparatus 1 as the light source apparatus 60. Described herein is an example in which IC chips are mounted on a substrate provided with a pattern containing gold as a metal member and in which terminals of the IC chips are soldered to the pattern by a solder containing tin.

Figure 12:
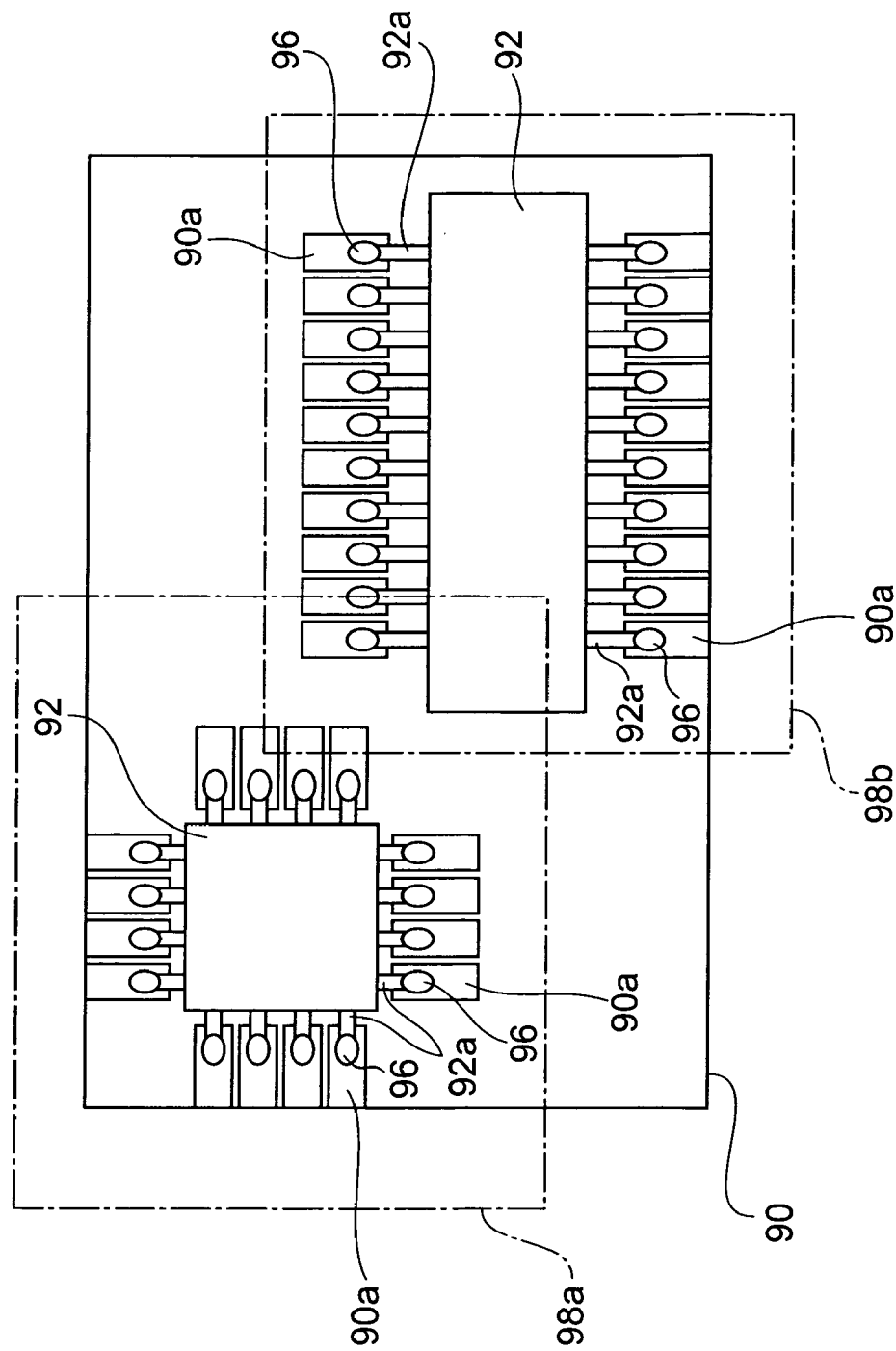
FIG. 12 is a screen example of a substrate displayed on a monitor.

FIG. 12 shows a screen example of the substrate displayed on the monitor. With use of the metal heating apparatus 5, the substrate 90 is first mounted on the first stage 66. Then the first stage 66 is moved, based on an image of the substrate 90 taken by the camera 76. For example, where two IC chips 92 are to be mounted on the substrate 90 as shown in FIG. 12, the first stage 66 is moved so as to apply the light from the exit end 30a onto one of regions 98a and 98b on which the IC chips 92 are to be mounted. This movement is executed so as to locate an after-described solder in a first region and locate a pattern 90a of the substrate 90 in a second region in a region exposed to the light from the exit end 30a. This movement may be executed by controlling a drive system for the first stage 66 on the basis of the result of image processing, or by hand.

Next, the IC chips 92 are mounted on the substrate 90. Then the solder supply unit 74 supplies the solder 96 onto the pattern 90a of the substrate 90 and onto the terminals 92a of IC chips 92.

Figure 13:
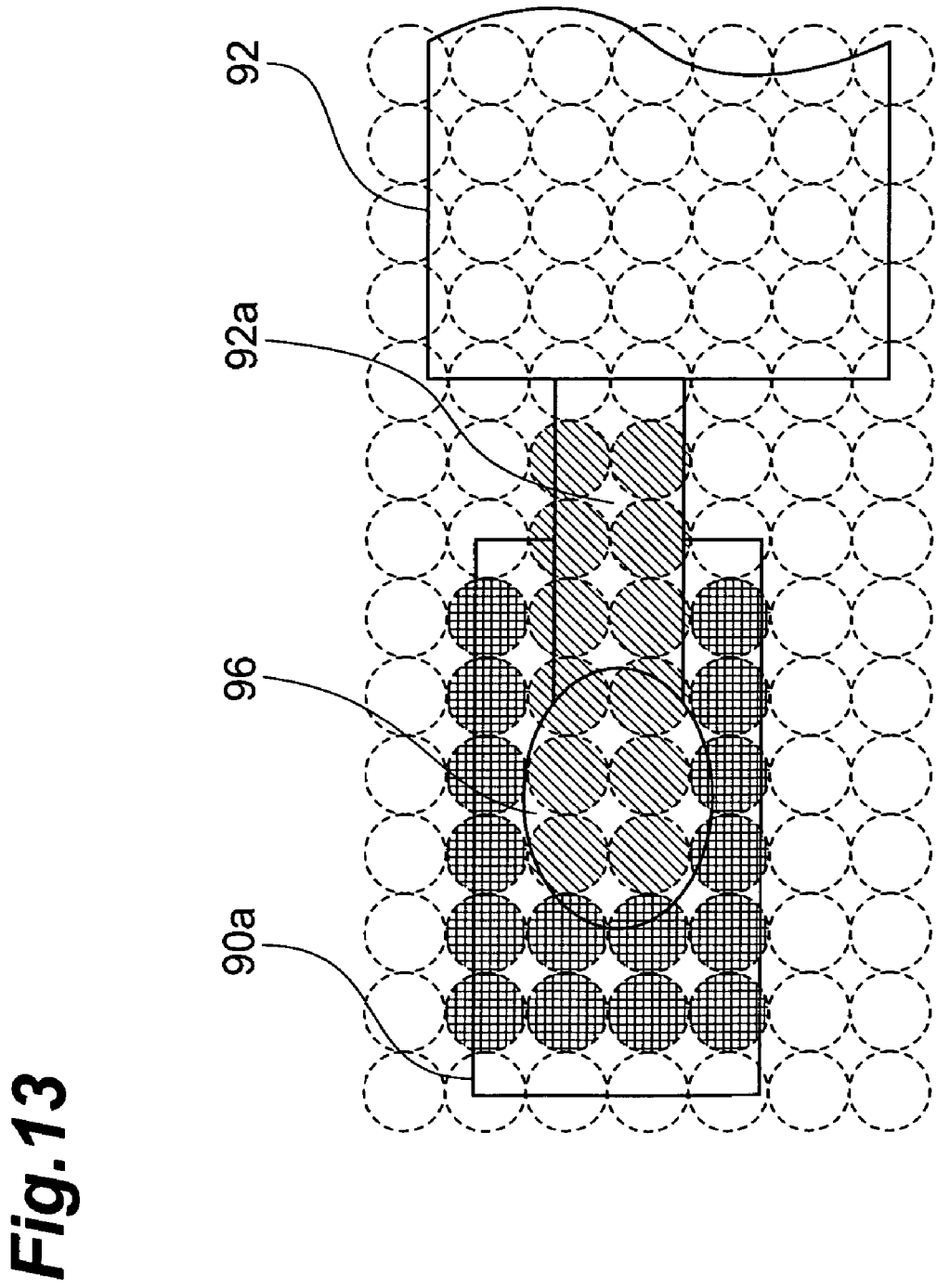
FIG. 13 is an illustration showing an enlarged view of a soldered portion.

Then the light is outputted from the light output portion 10 by drive currents from the controller 50. FIG. 13 is an illustration showing an enlarged view of a soldering portion. In FIG. 13, circular marks indicated by dotted lines represent spot beams from the respective optical fibers $30_{m,\,n}$ on the substrate 90.

Here the controller 50 controls the drive currents so that the drive current supplied to each light source $10_{m,n}$ to output the light applied onto the second region is greater than the drive current to each light source $10_{m,n}$ to output the light applied onto the first region. A much weaker drive current or no drive current is supplied to each light source $10_{m,n}$ to output light applied onto the other region. The first region is a region exposed to the spot beams obliquely hatched in FIG. 13, where the solder 96 is to be located. The second region is a region exposed to the spot beams checkered in FIG. 13, where the pattern 90a is to be located. This can make stronger the intensity of the light applied onto the pattern 90a, whereby the temperature of the pattern 90a can be increased ahead of the solder 96. As a result, the solder 96 is first melted in the part in contact with the pattern 90a, so as to achieve soldering with high reliability. The second region surrounds a part of the first region, so that the IC chip 92 is not exposed to the light with high intensity. Therefore, it prevents failure of IC chip 92.

After the solder 96 is melted, the supply of the current to each light source $10_{m,n}$ is stopped, so as to solidify the solder. At this time, the substrate 90 may be forcedly cooled to shorten the solidification time.

Then the first stage 66 is moved so as to apply the light from the exit end 30a onto the other region 98a or 98b, and thereafter the above process is repeated.

The above described the embodiments of the present invention, but it is noted that the present invention is by no means intended to be limited to the above embodiments and can be modified in various modification forms. For example, since the present invention permits efficient heating of the metal member containing gold, it is also applicable to annealing of metal, removal of distortion of metal, deformation of metal, and so on. It is also applicable to sintering a minute particle of metal.

The number of light sources does not have to be limited to two or more, but may be one. In the first embodiment the exit ends of the optical fibers were arrayed in the two-dimensional pattern, but the exit ends of the optical fibers may also be arrayed in a one-dimensional pattern.

The metal heating apparatus 1, 3, 4, and 4a can also be used as light source apparatus. When the metal heating apparatus 1 and 4a are used as light source apparatus, the light source apparatus can be suitably used as apparatus for applying various patterns of light. In this case, the light source apparatus can be provided with light sources for emitting light in various wavelength ranges, without having to be limited to those for emitting the light in the aforementioned predetermined wavelength range.

The present invention provides the metal heating apparatus, metal heating method, and light source apparatus capable of performing efficient heating according to an object.

The principles of the present invention have been illustrated and described in the preferred embodiments, but it is apparent to a person skilled in the art that the present invention can be modified in arrangement and detail without departing from such principles. We, therefore, claim rights to all variations and modifications coming with the spirit and the scope of claims.

What is claimed is:

1. A metal heating method comprising:
    a step of outputting light having a center wavelength in a wavelength range of 200 nm to 430 nm, from light outputting means, and
    a step of applying the light onto a metal member, the metal member comprises gold,
    wherein the light is emitted from a laser source or a light emitting diode.

2. The metal heating method according to claim 1, wherein the light is light having a center wavelength in a wavelength range of 390 nm to 420 nm.

3. The metal heating method according to claim 1, wherein laser light is outputted as the light.

4. The metal heating method according to claim 1 further including a step of injecting the light into an entrance end of light guiding means and guiding the light by the light guiding means to output the light from an exit end of the light guiding means.

5. The metal heating method according to claim 4, wherein the light is guided by an optical fiber as the light guiding means.

6. The metal heating method according to claim 1, further including a step of enlarging, converging or, collimating the light by a lens.

7. The metal heating method according to claim 1, wherein the light is outputted from each of a plurality of light sources as the light outputting means.

8. The metal heating method according to claim 7, wherein the plurality of light sources output laser light.

9. The metal heating method according to claim 7, further comprising a step of individually controlling output operations of the respective light sources by a controller.

10. The metal heating method according to claim 7 further including a step of injecting the light into an entrance end of light guiding means and guiding the light by the light guiding means to output the light from an exit end of the light guiding means.

11. The metal heating method according to claim 10, wherein each of a plurality of optical fibers as the light guiding means provided in one-to-one correspondence to the plurality of light sources guides light outputted from a corresponding light source out of the plurality of light sources.

12. The metal heating method according to claim 11, wherein the light is further guided by an optical fiber optically coupled to exit ends of the respective optical fibers as the light guiding means.

13. The metal heating method according to claim 7, further comprising a step of converging or collimating the light by a plurality of lenses provided in one-to-one correspondence to the plurality of light sources.

14. The metal heating method according to claim 11, wherein exit ends of the respective optical fibers are arrayed in a one-dimensional or two-dimensional pattern.

15. The metal heating method according to claim 14, further comprising:
    a step of mounting the metal member on mounting means;
    a step of taking an image of the metal member by image taking means;
    a step of adjusting a position of the metal member or a relative position of the exit ends, based on the image taken by the image taking means; and
    a step of individually controlling output operations of the respective light sources by a controller.

16. The metal heating method according to claim 15, wherein the controller controls the output operations of the light sources so that an intensity of light applied onto a second region surrounding a part of a first region is larger than an intensity of light applied onto the first region on the mounting means.

17. The metal heating method according to claim 1, wherein the light is applied onto the metal member to heat a solder.

18. The metal heating method according to claim 16, further comprising a step of supplying a solder containing tin, onto the metal member,
wherein the metal member contains gold, and
wherein the step of adjusting the position of the metal member comprises adjusting a position of the solder to the first region, and adjusting the position of the metal member to the second region.

19. A metal heating method comprising:
a step of supplying a second metal member onto a first metal member; and
a step of applying light onto both of the first metal member and the second metal member,
wherein the step of applying the light comprises applying the light of a center wavelength at a reflectance of the second metal member, the reflectance of the second metal member is larger than a reflectance of the first metal member, and
one of the first and second metal members comprises gold as a primary component,
wherein the light is emitted from a laser source or a light emitting diode.

20. The metal heating method according to claim 19, wherein the second metal member is a solder.

21. The metal heating method according to claim 19, wherein the first metal member comprises gold as a primary component and the second metal member comprises tin as a primary component, and
wherein the center wavelength of the light is not more than 550 nm.

22. A metal heating method comprising:
a step of supplying a second metal member onto a first metal member; and
a step of applying light onto both of the first metal member and the second metal member,
wherein the step of applying the light comprises a light irradiation area on the first metal member that is larger than a light irradiation area on the second metal member, and
one of the first and second metal members comprises gold as a primary component,
wherein the light is emitted from a laser source or a light emitting diode.

23. The metal heating method according to claim 22, wherein the step of applying the light comprises applying the light onto the first metal member only.

24. The metal heating method according to claim 22, wherein the first metal member comprises gold as a primary component and wherein the center wavelength of the light is less than 600 nm.

25. The metal heating method according to claim 24, wherein the second metal member is a solder comprising tin as a primary component.

26. A metal heating method comprising:
a step of supplying a second metal member onto a first metal member; and
a step of applying light onto both of the first metal member and the second metal member,
wherein the step of applying the light comprises an energy deposition amount applied to the first metal member is larger than an energy deposition amount applied to the second metal member, and
one of the first and second metal members comprises gold as a primary component,
wherein the light is emitted from a laser source or a light emitting diode.

27. The metal heating method according to claim 26, wherein the second metal member is a solder.

28. The metal heating method according to claim 26, wherein the first metal member comprises gold as a primary component and the second metal member comprises tin as a primary component.

29. A metal heating method comprising:
a step of supplying a second metal member onto a first metal member; and
a step of applying light onto both of the first metal member and the second metal member,
wherein the step of applying the light comprises applying a light beam of a first center wavelength and a light beam of a second center wavelength as the light, and
one of the first and second metal members comprises gold as a primary component,
wherein the light is emitted from a laser source or a light emitting diode.

30. The metal heating method according to claim 29, wherein the light beam of the first wavelength and the light beam of the second wavelength are outputted from a common exit position.

31. The metal heating method according to claim 30, further comprising a step of guiding the light beam of the first wavelength and the light beam of the second wavelength by a common optical fiber,
wherein the step of applying the light comprises outputting each of the light beam of the first center wavelength and the light beam of the second center wavelength from an end face of the optical fiber to apply the light beams onto the first metal member or onto the second metal member.

32. The metal heating method according to claim 29, wherein the step of applying the light comprises:
applying the light beam of the first center wavelength so that a light irradiation area on the first metal member is larger than a light irradiation area on the second metal member; and
applying the light beam of the second center wavelength so that a light irradiation area on the second metal member is larger than a light irradiation area on the first metal member.

33. The metal heating method according to claim 32, further comprising a step of guiding the light beam of the first center wavelength and the light beam of the second center wavelength by a bundle fiber,
wherein the step of applying the light comprises outputting the light beam of the first center wavelength and the light beam of the second center wavelength from respective, mutually different exit positions of the bundle fiber to apply the light beams onto the first metal member or onto the second metal member.

34. The metal heating method according to claim 29, wherein a center wavelength of the light beam of the first center wavelength is a wavelength width or more different from a center wavelength of the light beam of the second center wavelength.

35. The metal heating method according to claim 29, wherein a center wavelength of the light beam of the first center wavelength is 100 nm or more different from a center wavelength of the light beam of the second center wavelength.

36. The metal heating method according to claim 29, wherein the first metal member comprises gold as a primary component and wherein the first center wavelength is less than 600 nm.

37. The metal heating method according to claim 29, wherein the second metal member comprises tin as a primary component and wherein the second center wavelength is not less than 600 nm.

38. The metal heating method according to claim 37, wherein the second metal member is a solder.

39. The metal heating method according to claim 1, wherein absorptance of the light by gold is 60% or more.

* * * * *